(12) United States Patent
Cross et al.

(10) Patent No.: US 12,552,326 B2
(45) Date of Patent: Feb. 17, 2026

(54) SUPPORT INSERTION MECHANISM

(71) Applicant: Rivian IP Holdings, LLC, Plymouth, MI (US)

(72) Inventors: Lindsey Michelle Cross, Dana Point, CA (US); Lingke Song, Berkeley, CA (US); Matthew Matera, Newport Beach, CA (US); Jeremy Fu, Palo Alto, CA (US); Christian Elder, Irvine, CA (US); Austin Lee Frederickson, Carlsbad, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 352 days.

(21) Appl. No.: 18/187,111

(22) Filed: Mar. 21, 2023

(65) Prior Publication Data

US 2024/0217448 A1    Jul. 4, 2024

Related U.S. Application Data

(60) Provisional application No. 63/477,654, filed on Dec. 29, 2022.

(51) Int. Cl.
*B60R 11/00*    (2006.01)
*B60N 3/00*    (2006.01)

(52) U.S. Cl.
CPC .............. *B60R 11/00* (2013.01); *B60N 3/001* (2013.01); *B60R 2011/004* (2013.01); *B60R 2011/0082* (2013.01)

(58) Field of Classification Search
CPC .............. B60R 11/00; B60R 2011/004; B60R 2011/0082; B60N 3/001; E04H 12/22; E04H 12/2269
See application file for complete search history.

(56) References Cited

U.S. PATENT DOCUMENTS

| 4,657,299 | A | * | 4/1987 | Mahan | E04H 15/40 135/88.13 |
| 5,320,322 | A | * | 6/1994 | Williams | G09F 17/00 248/514 |
| 5,390,719 | A | * | 2/1995 | Barnes | E04H 14/00 160/46 |
| 11,230,231 | B1 | * | 1/2022 | Storer | B60R 9/06 |
| 11,756,460 | B1 | * | 9/2023 | Mingee | G09F 17/00 116/173 |

(Continued)

OTHER PUBLICATIONS

DiscountMugs, "Neoprene Collapsible Can Coolers", https://www.discountmugs.com/product/kznp001-neoprene-collapsible-can-coolers/.

*Primary Examiner* — Brian L Swenson
(74) *Attorney, Agent, or Firm* — Foley & Lardner LLP

(57) ABSTRACT

A pole insertion mechanism is provided. The pole end can include a bottom portion opposite a top portion of the pole end. A holder can receive the pole end. The holder can include a first opening located on a top portion of the holder. The holder can include a second opening located on a side portion of the holder. The second opening can be located below the first opening and configured to engage the pole end in the holder. The holder can include a third opening, located on a bottom portion of the holder. The third opening can be located below the first opening and the second opening. The third opening can be configured to receive the bottom portion of the pole end.

18 Claims, 18 Drawing Sheets

(56) References Cited

U.S. PATENT DOCUMENTS

| | | | |
|---|---|---|---|
| 2002/0100498 A1* | 8/2002 | Schlier | E04H 6/04 |
| | | | 135/88.06 |
| 2019/0248425 A1* | 8/2019 | Turner | A47B 37/04 |
| 2020/0254939 A1* | 8/2020 | Brown | A47C 11/005 |
| 2020/0383458 A1* | 12/2020 | Kersting | A45F 4/12 |
| 2020/0399923 A1* | 12/2020 | Sanger | E04H 12/2269 |
| 2022/0333398 A1* | 10/2022 | Pierman | E04H 12/2269 |

* cited by examiner

SUPPORT INSERTION MECHANISM

CROSS-REFERENCES TO RELATED APPLICATIONS

This application claims the benefit of priority under 35 U.S.C. § 119 to U.S. Provisional Patent Application No. 63/477,654, filed Dec. 29, 2022, which is hereby incorporated by referenced herein in its entirety.

INTRODUCTION

Objects can be supported by structures in various scenarios or to facilitate various activities, including, for example, camping, outdoor cooking, construction, outdoor sports, or recreation.

SUMMARY

This disclosure is generally directed to an insert mechanism, or holder, configured to receive a component, such as a stand or pole. The insert mechanism can reliably, and in a sturdy manner, engage or lock the component (e.g., a stand, pole, column, pillar, support structure, mast, or rod) such that the component can provide structural support to various other components or objects, such as a string light, among other things. For example, this technical solution can provide a sturdy design that allows for the quick insertion of a string light pole into a table, such as a camp kitchen. The portion of the pole that engages with the holder can be short enough such that it does not interfere with other components of or on the table. To do so, this technology includes an insert holder and a pole. The holder can include a groove. The pole end can include a ball or other protrusion that, when pushed into the holder, can engage with the groove in the holder and lock the pole in the holder by friction.

An aspect is directed to a system. The system can include a holder. The holder can receive a pole. The holder can include a first opening located on a first portion of the holder. The holder can include a second opening located on a second portion of the holder. The second opening can be configured to engage the pole in the holder.

An aspect is directed to a system. The system can include a pole to couple with a pole. The pole can include a protrusion. The pole can include a bottom portion opposite a top portion of the pole end. The pole can include a holder to receive the pole. The holder can include a first opening located on a top portion of the holder. The pole can include a second opening located on a side portion of the holder. The second opening can be located below the first opening and configured to engage the pole in the holder. The holder can include a third opening. The third opening can be located on a bottom portion of the holder. The third opening can be located below the first opening and the second opening and configured to receive the bottom portion of the pole.

An aspect is directed to a method. The method can include receiving, by a holder, a pole. The holder can include a first opening located on a top portion of the holder. The holder can include a groove located on the top portion of the holder, the groove configured to receive the protrusion of the pole to align the pole end with the holder. The holder can include a second opening located on a side portion of the holder, the second opening located below the first opening. The holder can include a third opening, located on a bottom portion of the holder, the third opening located below the first opening and the second opening and configured to receive the bottom portion of the pole.

An aspect is directed to a vehicle such as an electric vehicle. The electric vehicle can include a holder to receive a pole. The holder can include a first opening located on a first portion of the holder. The holder can include a second opening located on a second portion of the holder. The second opening can engage the pole in the holder.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of an insert mechanism. The various concepts introduced above and discussed in greater detail below may be implemented in any of numerous ways.

The present disclosure is directed to systems and methods of an insertion holder. The component and an insertion holder can be coupled together to provide support for the component, which may take the form of a structure, a stand, and/or a pole, among other possibilities. The component, such as a pole, can be used to hang string lights, such as string lights being used for camping or as a part of an electric vehicle. Current support systems for poles may utilize deep holder in order to provide support to the tall poles. In camping and electric vehicle spaces however, a shallow support apparatus can provide an efficient holding mechanism where there are space constraints. Further, a shallow support mechanism that provides reliable, sturdy structural integrity can reduce the usage of materials, manufacturing costs, and weight. Thus, this technical solution can support the load of string lights, for example, without wavering or bending or with reduced waving or bending in various environmental conditions.

The disclosed solutions have a technical advantage of providing a shallow support member for portable string hanging lights. The solution includes a shallow holder which can accept an end or portion of a pole, such as a pole end. The grooves and protrusions of the holder and pole end enable a strong yet shallow support for supporting poles of a camp kitchen or electric vehicle.

Figure 1:
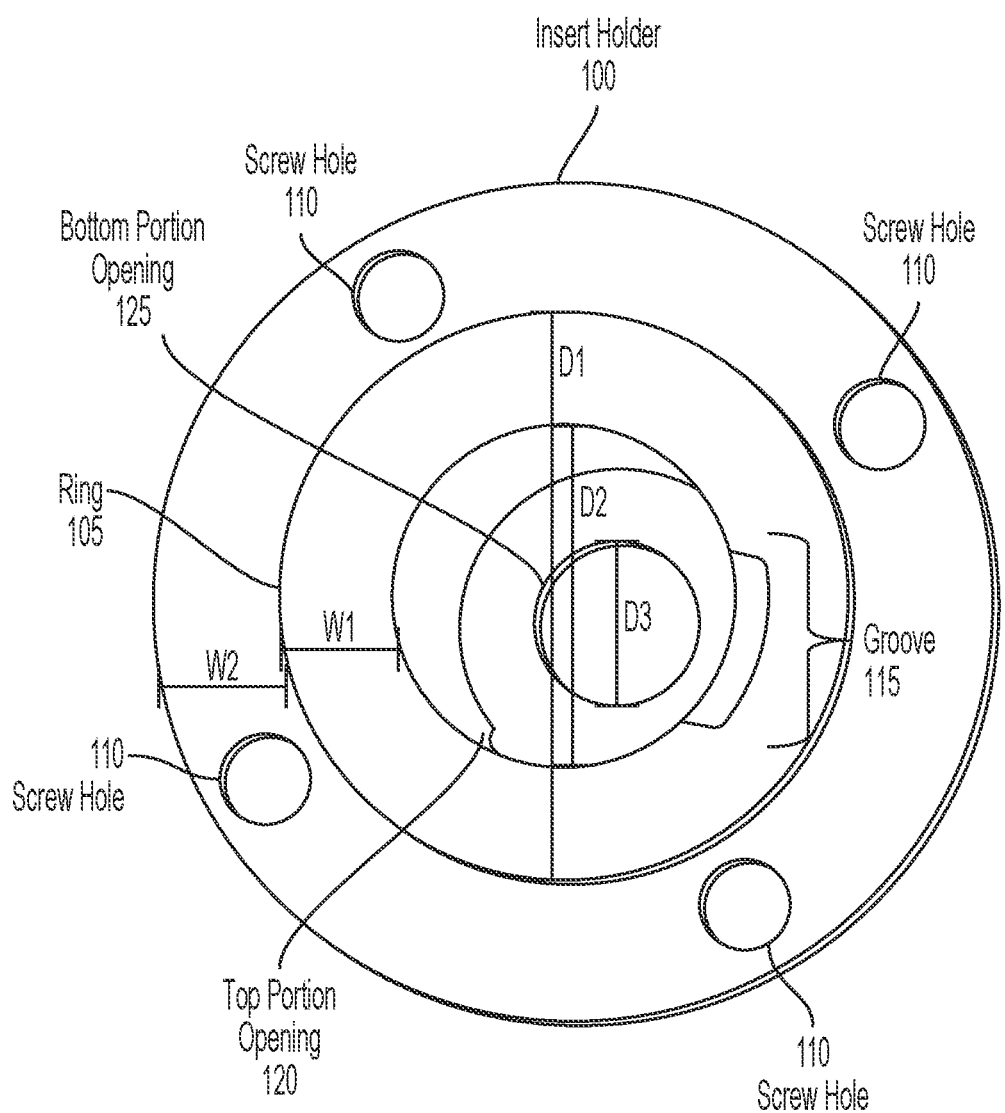
FIG. 1 depicts a top view of an example insert holder.

FIG. 1 depicts a top view of an example insert holder 100. The insert holder 100 and its subparts may be discussed in combination and with reference to at least FIGS. 1, 2, and 3. The insert holder 100 can include a top portion 305, a bottom portion 310, a ring 105, one or more screw holes 110, a groove 115, top portion opening 120, a bottom portion opening 125, a side opening 210, a locking face 205, widths W1 and W2, or diameters D1, D2, and D3. Holder 100 can be similar in functionality and structure to a holder 400, as described in FIGS. 4, 5, and 6.

Figure 3:
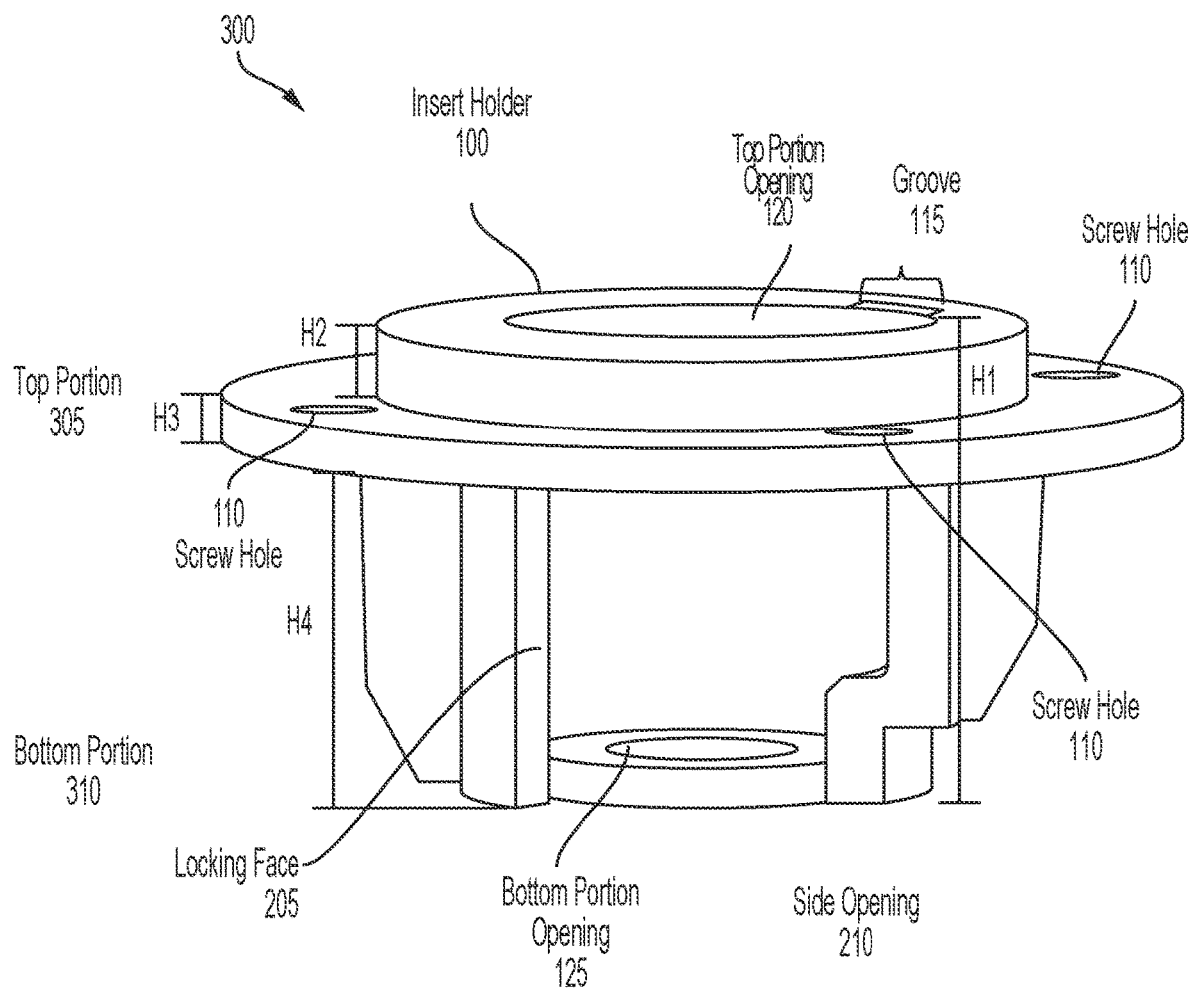
FIG. 3 depicts a side view of an example insert holder.
Figure 7:
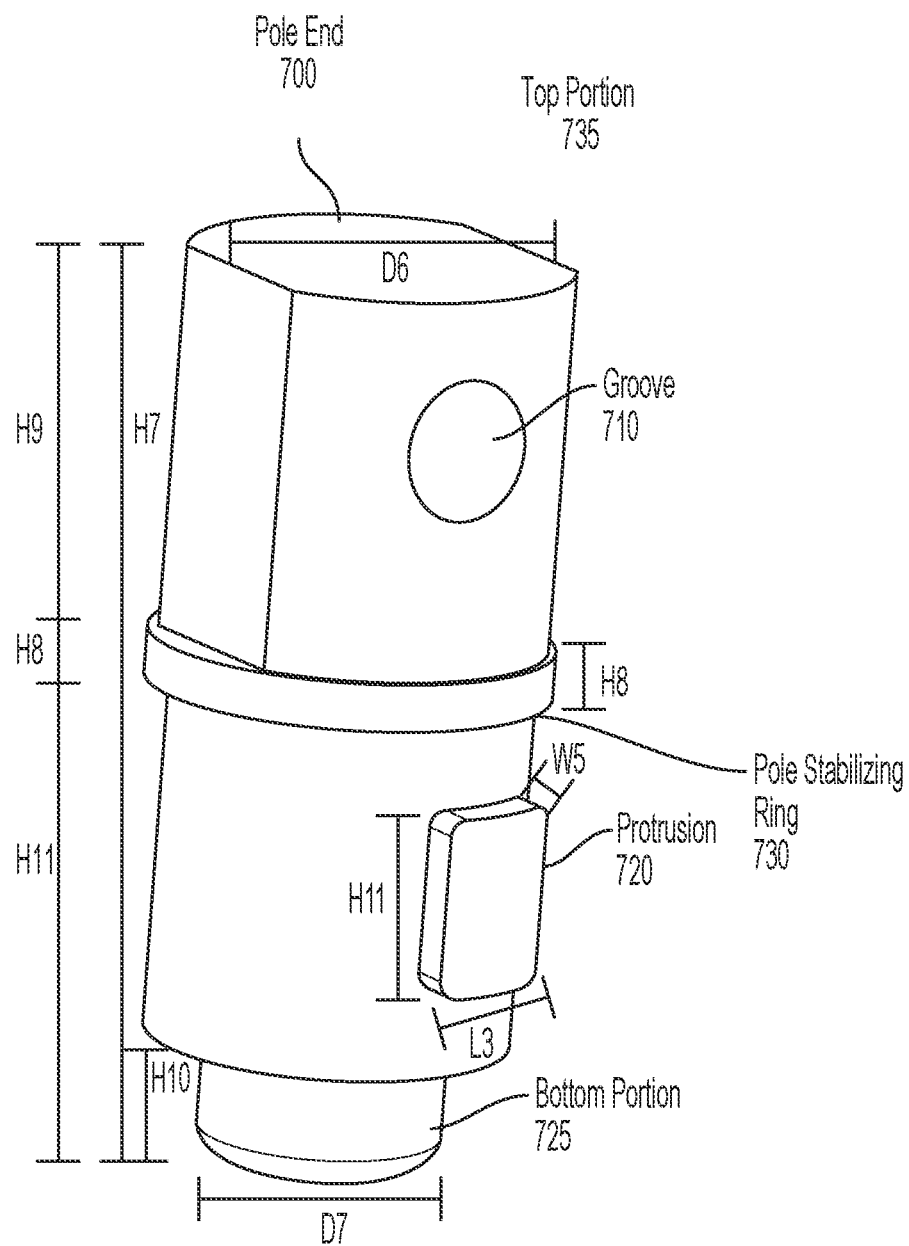
FIG. 7 depicts a view of an example insert pole end.

In an illustrative example, the holder 100 can receive a component, such as a pole, stand, column, pillar, mast, rod or other support structure. The holder 100 can receive a portion of the support structure, such as an end of the support structure or other portion of the pole. For example, the holder 100 can receive a pole end 700, an example of which is depicted in FIG. 7. The pole end 700 can be coupled with, or a part of, the pole 905. The pole end 700 can align with the groove 115 of the holder 100 to secure the pole 905 and pole end 700 within the holder 100. The holder 100 can be made of plastic (e.g., polycarbonate (PC) or polyvinyl chloride (PVC)), metal (e.g., aluminum, steel, titanium, or an alloy thereof), wood (e.g., oak or bamboo), or rubber. From the top view depicted in FIG. 1, the holder 100 can be circular, rectangular, or any other shape. The holder 100 can be fabricated using one or more fabrication or manufacturing techniques, including, for example, casting, molding, carving, milling, welding, or machining. The holder 100 can have a total height of H1, as illustrated in FIG. 3. H1 can be shallow. H1 can be between 2-4 centimeters (cm), for example. H1 can be between 1 cm-3 cm. H1 can be less than 1 cm. H1 can be greater than 4 cm. H1 can be based on or proportional to a length of the pole 700, a diameter of the pole, an amount of weight to be supported by the holder 100, or the thickness of the table or other surface with which the holder 100 is coupled, affixed, or integrated.

The holder 100 can include a top portion 305, as depicted in FIG. 3. Top portion 305 can include heights H2 and H3. Top portion can have a height of H3. H3 can be between 2 mm-6 mm. H3 can be between 0.5 mm-3 mm. H3 can be less than 2 mm. H3 can be greater than 6 mm. Top portion 305 can include a top portion opening 120. Top portion opening 120 (or "top opening 120") can be located on a top portion of the holder 100, as shown in FIG. 1. Top opening 120 can accept a pole end 700. The diameter of top opening 120 can be D2. D2 can be between 1 cm-2 cm. D2 can be between 0.2 cm-1.2 cm. D2 can be greater than 1.2 cm. D2 can be less than 0.2 cm. D2 can be larger than a diameter D6 of the pole end 700. Top portion opening 120 can be surrounded or encompassed by a ring 105.

Ring 105 can be inset into the top portion of the holder 100. Ring 105 can protrude from the top portion of the holder 100. As shown in FIG. 3, ring 105 can have a height H2. H2 can be between 2 mm-4 mm. H2 can be between 3 mm-6 mm. H2 can be less than a height H1. H2 can be greater than 6 mm. H2 can be less than 2 mm. Ring 105 can have a diameter D1. D1 can be greater than D2. D1 can be between 0.5 cm-1.5 cm. D1 can be between 0.2 cm-1 cm. D1 can be less than 0.2 cm. D1 can be greater than 1.5 cm. Ring 105 can be extended into or cored away by the groove 115. Ring 105 can have a width W1. W1 can be the distance between two concentric circles of ring 105. In some cases, W1 can be half of the difference between D1 and D2. W1 can be between 0.5 and 1.5 cm. W1 and be between 1.0 and 2.5 cm. W1 can be less than 0.5 cm. W1 can be greater than 1.5 cm. Pole end 700 can encircle, sit upon, or rest within ring 105.

Groove 115 can be any cutout, notch, indent, or slot located on the top portion 305 of the holder 100 and extending through the holder 100. The groove 115 can be any shape, such as square, rectangular, cylindrical. In some implementations, the groove 115 can be configured to receive a protrusion 720 of the pole end 700 to align the pole end 700 with the holder 100. The groove 115 can be larger than the protrusion 720 to receive the protrusion 720. The groove 115 can extend into W1 of ring 105 by 0.2-0.75 cm. The groove 115 can extend into W1 of ring 105 by 0.5-1.25 cm. The groove 115 can extend into the entire width W1. In some implementations, the groove 115 opens into a larger side opening 210, as shown in FIG. 3.

Figure 2:
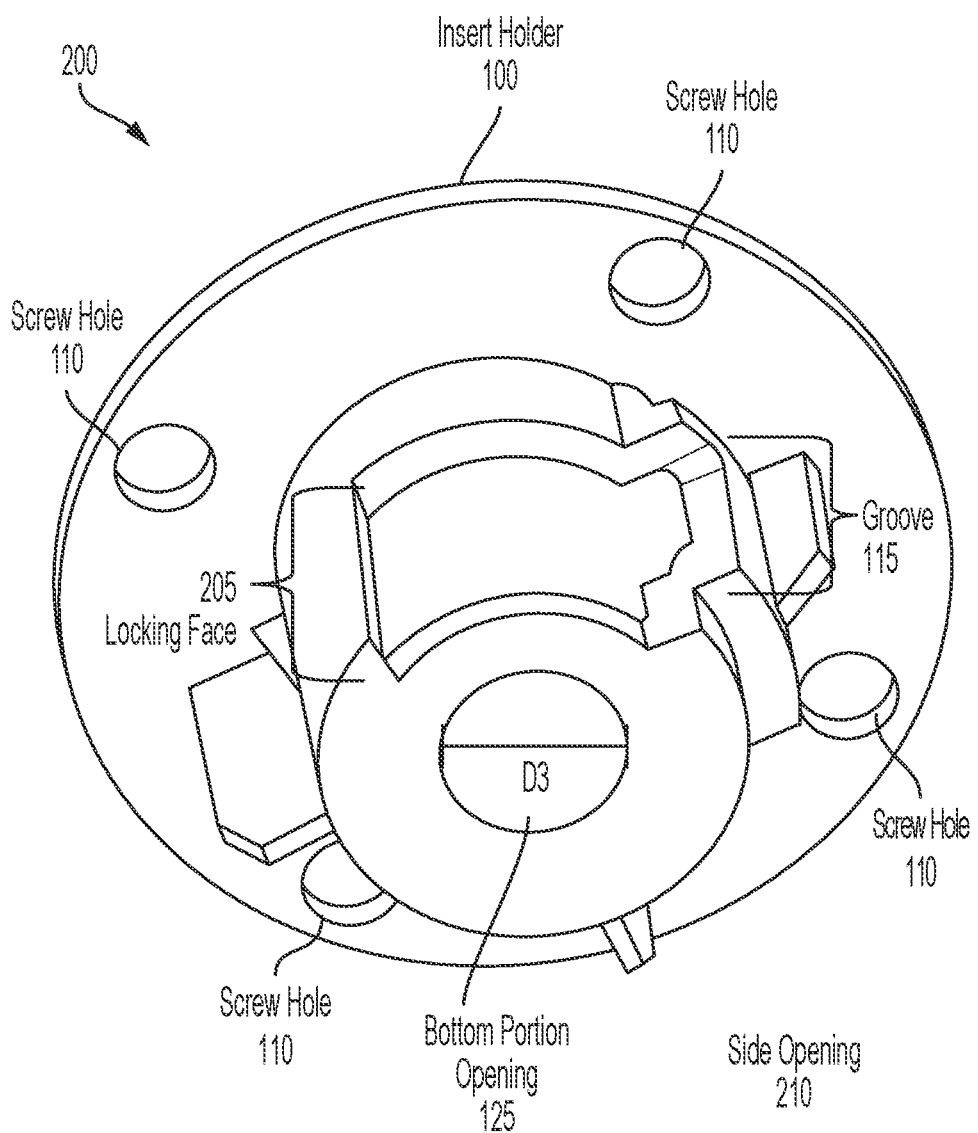
FIG. 2 depicts a bottom view of an example insert holder.

FIG. 3 illustrates an example side opening 210. Side opening 210 can be a second opening located on a side portion of the holder 100. The height of the side portion of the holder can be denoted by H4. H4 can be between 1-3 cm. H4 can be between 2-4 cm. H4 can be smaller than H1. H4 can be greater than H3 or H2. Side opening 210 can extend within the length of H4. Side opening 210 can be located below the first opening (e.g., top portion opening 120). Side opening 210 can be located in a perpendicular plane to the top portion opening 120. Side opening 210 can be offset from groove 115. Side opening 210 can be larger than groove 115. Side opening 210 can include a locking face 205, as shown in FIGS. 2 and 3. In some implementations, locking face 205 can impede the pole 905 and pole end 700 from rotating freely within the holder 100. In some implementations, the protrusion 720 will engage with the locking face 205 to prevent further movement of the pole 905 and the pole end 700. Side opening 210 can be capped by the bottom portion of the holder 100.

The holder 100 can include a bottom portion 310. The bottom portion 310 can include a bottom portion opening 125. Bottom portion opening 125 (also "bottom opening 125") can be a third opening located on a bottom portion 310 of the holder 100. Bottom opening 125 can be a third opening located below the first opening (e.g., top portion opening 120) and the second opening (e.g., side opening 210) and configured to receive a bottom portion 725 of the pole end 700. Bottom opening 125 can have a diameter D3. D3 can be less than D2. In some cases, D3 can be range from 0.5 mm-2 mm or 1 mm-5 mm. D3 can be less than a diameter D6 of the pole end 700. D4 can be greater than a diameter D7 of a bottom portion 725 of the pole end 700 such that the pole 700 is prevented, blocked, or stopped from sliding through the bottom portion opening 125. However, the pole end 700 can include a bottom portion 725 that has a diameter D7 that is less than the diameter D6 of the pole 700. The diameter D7 of the bottom portion 725 can be less than the diameter D3 of the bottom portion opening 125 such that the bottom portion 725 can traverse or at least partially go through the bottom portion opening 125. Thus, the bottom portion opening 125 can be designed, constructed and operational to engage or lock the bottom portion 725 of the pole end 700 in the insert holder 100.

Figure 17:
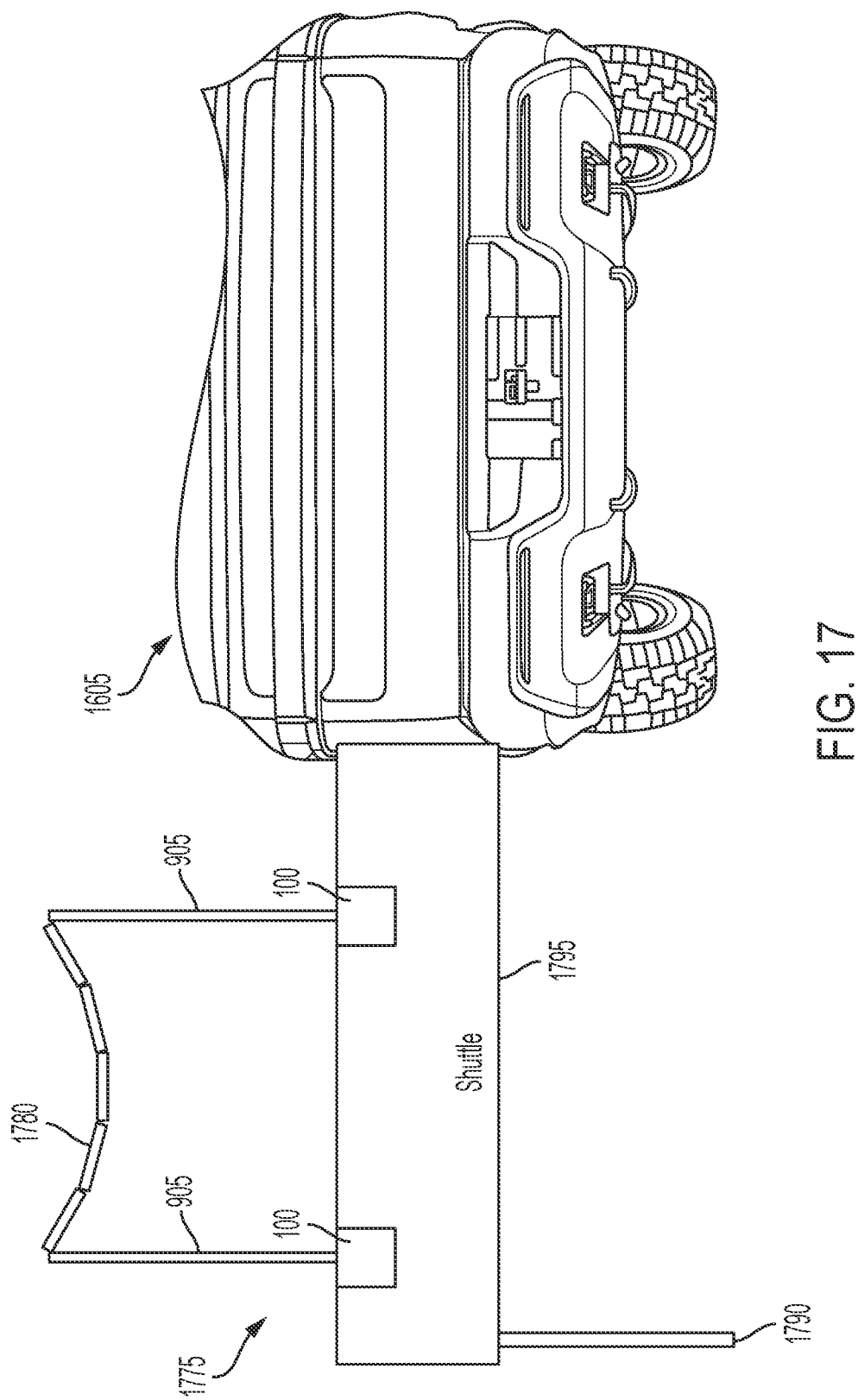
FIG. 17 depicts a vehicle with an example light pole assembly.

The holder 100 can be coupled, affixed, attached, secured to, or otherwise held to a surface. The holder 100 can be welded to a surface, glued to a surface, be integrated or part of the surface, stapled to the surface, nailed to the surface, screwed to the surface, or otherwise be coupled with or integrated with the surface. For example, the holder 100 can include screw holes 110 to affix the holder 100 to a surface. The screw holes 110 can be located around the top portion 305 of the holder 100. The screw holes 110 can extend through the top portion 305. The screw holes 110 can be threaded. The screw holes 110 can accept screws, bolts, fasteners, or nails. The screw holes 110 can accept locking screws. The screw holes 110 can enable fastening of the holder 100 to a surface, such as a table of a vehicle, a camp kitchen, or a shuttle 1795 as shown in FIG. 17. The diameter of the screw holes 110 can be less than width W2. W2 can be between 0.5 and 1.5 cm. W2 can be between 1.0 and 2.5 cm. W2 can be less than 0.5 cm. W2 can be greater than 1.5 cm.

Figure 4:
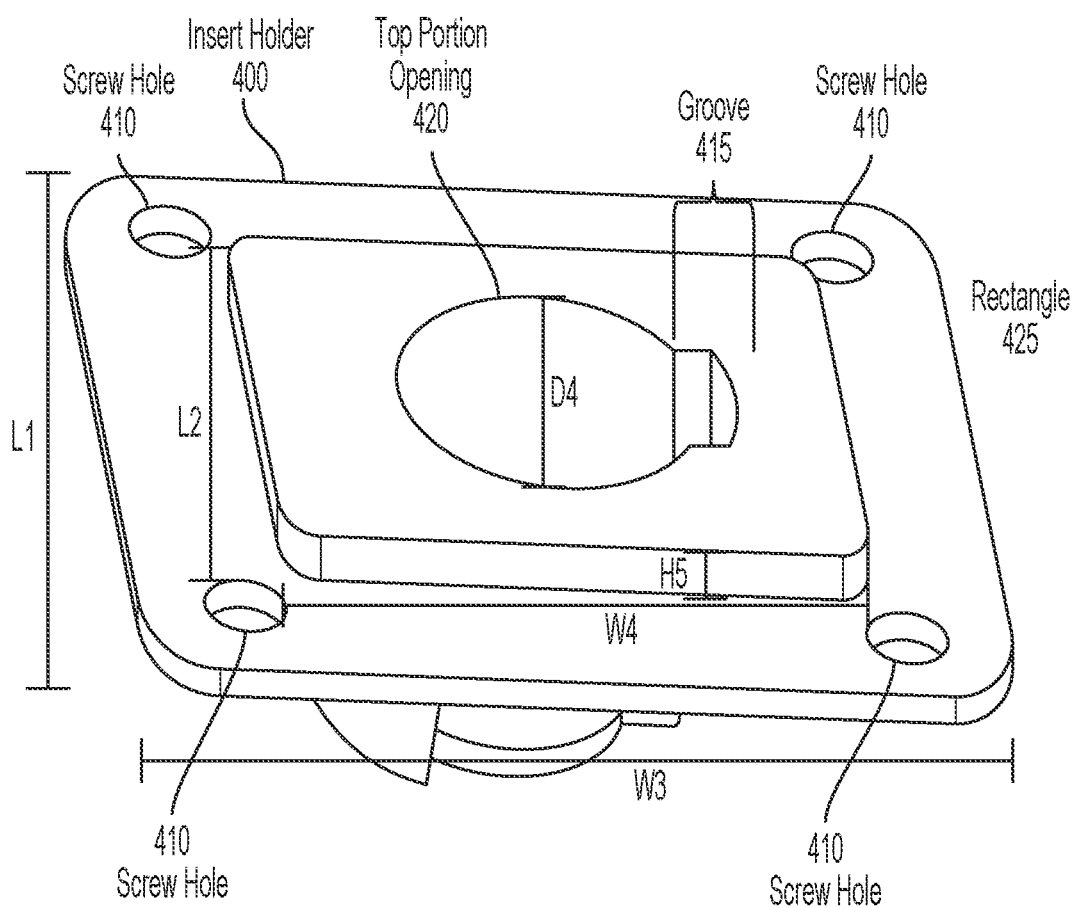
FIG. 4 depicts a top view of an example insert holder.
Figure 5:
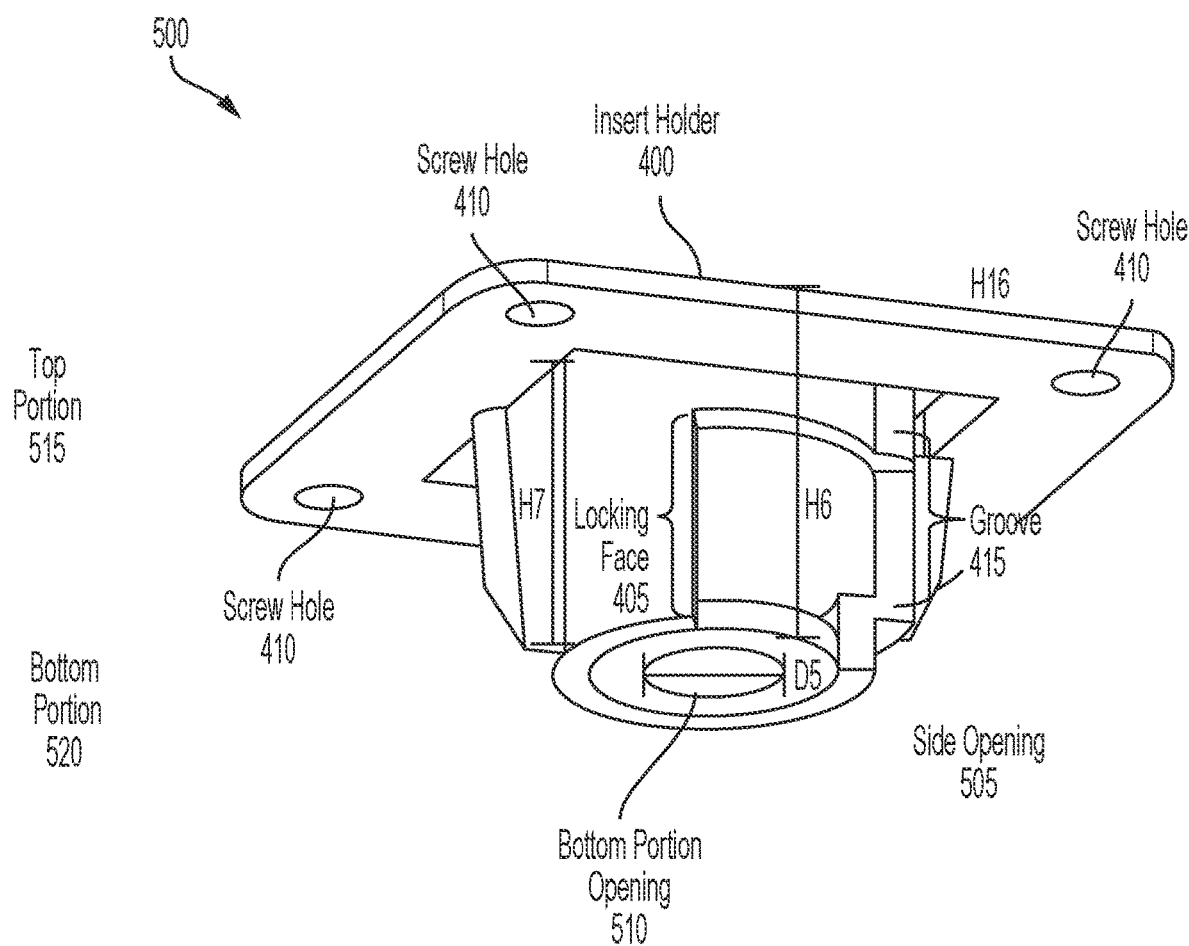
FIG. 5 depicts a side view of an example insert holder.
Figure 6:
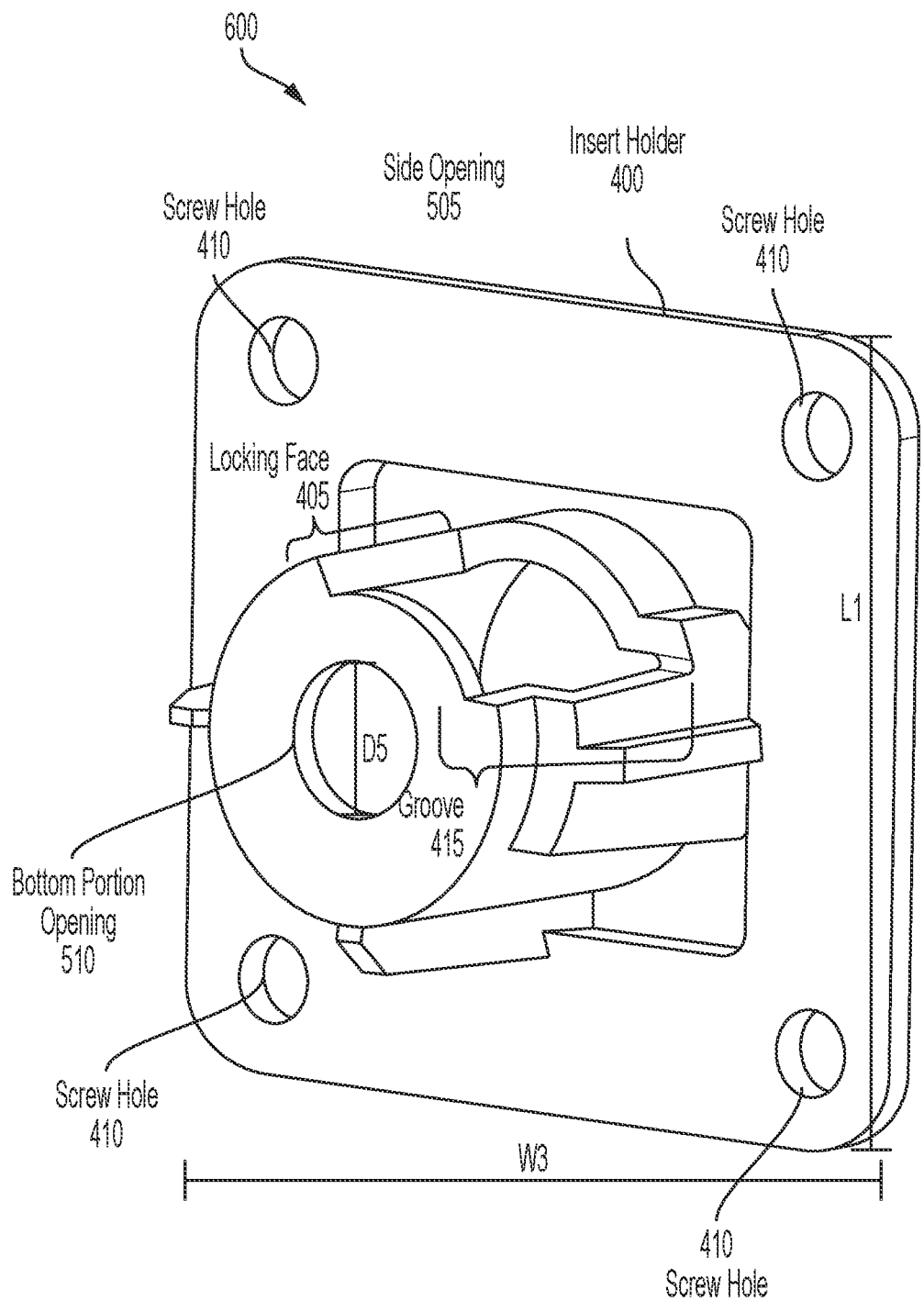
FIG. 6 depicts a bottom view of an example insert holder.

FIGS. 4, 5, and 6 depict different views of an example insert holder 400. Insert holder 400 can be and have the same or similar structure, materials, components, or functionality of insert holder 100. Insert holder 400 can be an example rectangular holder for receiving a pole end, such as a pole end 700. Insert holder 400 can include a rectangle 425, one or more screw holes 410, a groove 415, top portion opening 420, a bottom portion opening 510, widths W3, W4, diameters D4 and D5, lengths L1, L2, and heights H5, H6 and H16. For example, the insert holder 400 (or "holder 400") can receive a pole end 700 described herein. At a high level, the holder 400 can receive a pole end 700 coupled with a pole 905. The pole end 700 can align with the groove 415 of the holder 400 to secure the pole 905 and pole end 700 within the holder 400. The holder 400 can be made of plastic (e.g., polycarbonate (PC) or polyvinyl chloride (PVC)), metal (e.g., aluminum, steel, titanium, or an alloy thereof), or wood (e.g., oak or bamboo). In some implementations, the holder 400 can include one or more ball-nose spring plungers. A ball-nose spring plunger can be any device which, through pressure exerted by a spring force, exerts friction onto a component for stabilization, such as pole 905 or pole end 700. For example, upon insertion of the pole end 700 into the holder 400, one or more ball-nose spring plungers can extend to couple with a groove of the pole end.

From a top view, the holder 400 can be circular, rectangular, or any other shape. The holder 400 can be fabricated by any means known to those in the art, such as casting, molding, carving, milling, welding, or machining. The holder can have a total height of H6, shown in FIG. 5. H6 can be shallow. H6 can be between 2 cm-4 cm. H6 can be between 1 cm-3 cm. H6 can be less than 1 cm. H6 can be greater than 4 cm. Holder 400 can have a length L1 and a width W3. Length L1 and length W3 can be the same distances or different. L1 and W3 can be between 2 cm-4 cm. L1 and W3 can be between 1 cm-3 cm. L1 and W3 can be less than 1 cm. L1 and W3 can be greater than 4 cm.

The holder 400 can include a top portion 515, shown in FIG. 5. Top portion 515 can include heights H5 and H16. Top portion 515 can include a top portion opening 420. Top portion opening 420 (or "top opening 420") can be located on a top portion 515 of the holder 400, as shown in FIG. 3.

Top opening 420 can accept pole end 700. The diameter of top opening 420 can be D4. D4 can be between 1 cm-2 cm. D4 can be between 0.2 cm-1.2 cm. D4 can be greater than 1.2 cm. D4 can be less than 0.2 cm. D4 can be larger than a diameter D6 of the pole end 700. The top portion 515 can have a height of H16. H16 can be between 2 mm-6 mm. H16 can be between 0.5 mm-3 mm. H16 can be less than 2 mm. H16 can be greater than 6 mm. Top portion opening 120 can be surrounded or encompassed by a rectangle 425.

Rectangle 425 can be inset into the top portion 515 of the holder 100. Rectangle 425 can protrude from the top portion of the holder 400. As shown in FIG. 4, rectangle 425 can have a height H5. H5 can be between 2 mm-4 mm. H5 can be between 3 mm-6 mm. H5 can be less than a height H6. H5 can be greater than 6 mm. H5 can be less than 2 mm. Rectangle 425 can have a length L2 and a width W4. L2 and W4 can be the same distance or different distances. L2 and W4 can be greater than D4. L2 and W4 can be between 0.5 cm-3 cm. L2 and W4 can be between 1 cm-4 cm. L2 and W4 can be less than 0.5 cm. L2 and W4 can be greater than 4 cm. Rectangle 425 can be extended into or cored away by the groove 415. Rectangle 425 can have a width W1. In some implementations, pole end 700 can encircle, sit upon, or rest within rectangle 425.

Groove 415 can be any cutout, notch, indent, or slot located on the top portion of the holder 400. The groove 415 can be any shape, such as square, rectangular, cylindrical. In some implementations, the groove 415 can be configured to receive a protrusion 720 of the pole end 700 to align the pole end 700 with the holder 400. The groove 415 can be larger than the protrusion 720 to receive the protrusion 720. The groove 415 can extend into the area of rectangle 425 by 0.2-0.75 cm. The groove 415 can extend into the area of rectangle 425 by 0.5-1.25 cm. The groove 415 can extend into the entire width W4. In some cases, the groove 415 opens into a larger side opening 505, as shown in FIG. 5.

FIG. 5 shows the side opening 505. Side opening 505 can be a second opening located on a side portion of the holder 400. The height of the side portion of the holder 400 can be denoted by H7. H7 can be between 1-3 cm. H7 can be between 2-4 cm. H7 can be smaller than H6. H7 can be greater than H5 or H16. Side opening 505 can extend within the length of H7. Side opening 505 can be located below the first opening (e.g., top portion opening 420). Side opening 505 can be located in a perpendicular plane to the top portion opening 420. Side opening 505 can be offset from groove 415. Side opening 505 can be larger than groove 415. Side opening 505 can include a locking face 405, as shown in FIGS. 5 and 6. In some implementations, locking face 405 can impede the pole 905 and pole end 700 from rotating freely within the holder 400. In some implementations, the protrusion 720 will engage with the locking face 405 to prevent further movement of the pole 905 and the pole end 700. Side opening 505 can be capped by a bottom portion 520 of the holder 400.

The holder 100 can include a bottom portion 520. The bottom portion 520 can include a bottom portion opening 510. Bottom portion opening 510 (also "bottom opening 510") can be a third opening, located on a bottom portion of the holder 400. Bottom opening 510 can be a third opening located below the first opening (e.g., top portion opening 420) and the second opening (e.g., side opening 505) and configured to receive a bottom portion 725 of the pole end 700. Bottom opening 510 can have a diameter D5. D5 can be less than D4. In some cases, D5 can be between 0.5 mm-2 mm. In some implementations, D5 can be between 1 mm-5 mm. D5 can be less than a diameter D6 of the pole end 700. D5 can be greater than a diameter D7 of a bottom portion 725 of the pole end 700.

The holder 400 can include screw holes 410 to affix the holder 400 to a surface. The screw holes 410 can be located around the top portion 515 of the holder 400. The screw holes 410 can extend through the top portion 515 of the holder 400. The screw holes 410 can be threaded. The screw holes 410 can accept screws, bolts, fasteners, or nails. The screw holes 410 can accept locking screws. The screw holes 410 can enable fastening of the holder 400 to a surface, such as a table of a vehicle, a camp kitchen, or a shuttle 1795 as shown in FIG. 17. The diameter of the screw holes 410 can be less than the difference between W4 and W3, or between L1 and L2. The difference can be between 0.5 and 1.5 cm. The difference can be between 1.0 and 2.5 cm. The difference can be less than 0.5 cm. The difference can be greater than 1.5 cm.

FIG. 7 depicts a view of an example pole end 700 to couple with a pole (e.g., pole 905) and a holder (e.g., holder 100 or 400). Pole end 700 can include a top portion 735, a groove 710, a protrusion 720, a bottom portion 725, a pole stabilizing ring 730, heights H8, H9, H10, and H11, diameters D6 and D7, length L3 and width W5. Pole end 700 can be any type of shape, such as cylindrical, prismatic, or cubic. Pole end 700 can be made of plastic (e.g., polycarbonate (PC) or polyvinyl chloride (PVC)), metal (e.g., aluminum, steel, titanium, or an alloy thereof), or wood (e.g., oak or bamboo). Pole end 700 can include threads for attaching pole 905 onto. Pole end 700 can be fabricated by any means known to those in the art, such as casting, molding, carving, milling, welding, or machining. Pole end 700 can have a total height of H7. H7 can be between 2 cm-4 cm. H7 can be between 3 cm-5 cm. H7 can be less than 2 cm. H7 can be less than 4 cm.

Top portion 735 can indicate the portion of the pole end 700 which can be inserted into the pole 905. Top portion 735 can have a diameter of D6. D6 can be less than the inner diameter of the pole 905. D6 can be between 0.5 cm-1.5 cm. D6 can be between 1 cm and 2.5 cm. D6 can be less than 0.5 cm. D6 can be greater than 2.5 cm. Top portion 735 can have a height H9, as shown in FIG. 7. H9 can be less than H7. H9 can be between 1 cm-3 cm. H9 can be between 0.5 cm-2.5 cm. H9 can be less than 0.5 cm. H9 can be greater than 3 cm. Top portion 735 can include a groove 710. In some implementations, groove 710 can engage with a ball-nose plunger of the pole 905 to provide stabilization.

Pole end 700 can include pole stabilizing ring 730. Pole stabilizing ring 730 can subsect the pole end 700 between the top portion 735 and the bottom portion 725. Pole stabilizing ring 730 can have a height H8. H8 can be less than H9. H8 can be between 0.5 mm and 2 mm. H8 can be between 1 mm and 3 mm. H8 can be less than 0.5 mm. H8 can be greater than 3 mm. Pole stabilizing ring 730 can, In some implementations, sit upon ring 105 or rectangle 425. In some implementations, pole 905 can encircle stabilizing ring 730. In some implementations, pole 905 can rest upon stabilizing ring 730. In some implementations, the outer diameter of ring 730 can be greater than D4 or D2. In some implementations, the outer diameter of ring 730 can be between 1 cm-2 cm. The outer diameter of ring 730 can be between 0.2 cm-1.2 cm. The outer diameter of ring 730 can be greater than 1.2 cm. The diameter of ring 730 can be less than 0.2 cm. The height from the ring through the bottom portion 725 can be H11. H11 can be between 1 cm-3 cm. H11 can be between 0.5 cm-2.5 cm. H11 can be less than 0.5 cm. H11 can be greater than 3 cm.

Bottom portion 725 can be below pole stabilizing ring 730. Bottom portion 725 can be opposite top portion 735. In some cases, bottom portion 725 can be inserted into bottom portion opening 125 or 510 to provide pole stabilization. Bottom portion 725 can have a diameter D7 and a height H10. D7 can be less than D3 or D5. D7 can be between 0.2 mm-1.5 mm. In some implementations, D7 can be between 1 mm-5 mm. D7 can be less than 0.2 mm. D7 can be greater than 5 mm. H10 can be less than H7. H10 can be between 5 mm-15 mm. H10 can be between 10 mm-20 mm. H10 can be less than 5 mm. H10 can be greater than 20 mm. In some implementations, bottom portion 725 can be a ball-nose plunger which, upon insertion of the pole end 700 into the holder 100 or 400, can depress through the force of the pole end 700 and pole 905 assembly to hold the assembly in place or to engage the holder with friction.

The pole end 700 can include a protrusion 720 located between the top portion 735 and the bottom portion 725. The protrusion 720 can be any protruding element between the top portion 735 and the bottom portion 725 of the pole end 700. The protrusion can be fixed (e.g., rigid), or the protrusion can recede into the pole end 700. In some implementations, the protrusion 720 is a ball-nose plunger which recedes upon insertion of the pole end into the top portion opening (e.g., top portion opening 120 or 420) and then engages the holder (e.g., holder 100 or 400) with friction upon insertion past the top portion opening (e.g., top opening 120 or 420) to engage with a groove (e.g., groove 115 or 415) of the holder. In some implementations, the protrusion 720 can align the pole end 700 with the holder 100 or 400 by aligning with a groove 115 or 415, respectively. For example, the protrusion 720 can guide the placement of the pole end 700 into the top portion opening 120 or 420. The length of the protrusion L3 can be less than the groove 115 or 415. For example, L3 can be between 1 mm-4 mm. L3 can be between 0.2 mm-2 mm. L3 can be less than 0.2 mm. L3 can be greater than 4 mm. The height H11 of the protrusion 720 can be less than the height of the groove 115 or 415. H11 can be between 0.5-1 cm. H11 can be between 0.75-1.5 cm. H11 can be less than 0.5 cm. H11 can be greater than 1.5 cm. The width W5 of the protrusion can be such that it may not move past the locking face 205 or 405. The width W5 can be between 2 mm-10 mm. The width W5 can be between 0.5 mm-1.5 cm. The width W5 can be less than 2 mm. W5 can be greater than 3 cm. In some implementations, subsequent to insertion of the pole end 700 into the holder 100 or 400, the pole end 700 can be rotated. The pole end 700 can be rotated clockwise or counter-clockwise. The rotation can be between 85°-95°. The rotation can be between 80°-100°. The rotation can be greater than 100°. The rotation can be less than 80°. Subsequent to a rotation of the pole end 700, the protrusion 720 may engage with a locking face (e.g., locking face 205 or 405). The locking face 205 or 405 may prevent further rotation of the pole end 700 or pole 905.

Figure 8:
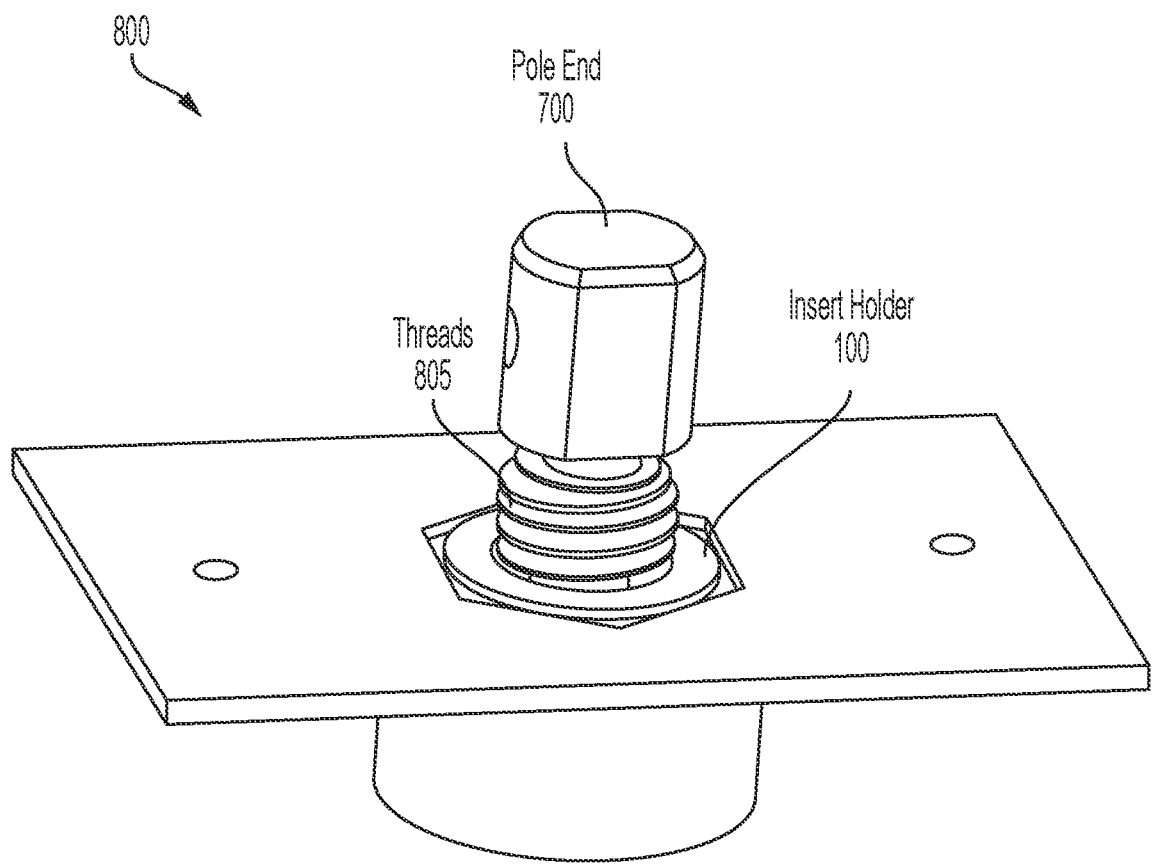
FIG. 8 depicts an example assembly of a pole end and holder apparatus with threads.

FIG. 8 depicts an example assembly 800 of the pole end 700 with threads and the holder 100. The pole end 700 can be inserted into the holder 100 as described herein. In some implementations, as described with reference to FIG. 700, the pole end can include threads 805. In some implementations, the pole 905 can be fitted onto threads of the pole end 700. Threads 805 can be in any quantity. Threads 805 can be any width of thread. Threads 805 can be threaded clockwise or counter-clockwise. In some implementations, the pole 905 can engage with the threads 805 through rotations of the pole 905. In some implementations, 3 turns can engage the holder 100. More than 3 turns can engage the holder 100 or 400. Less than 3 turns can engage the holder 100 or 400.

Figure 9:
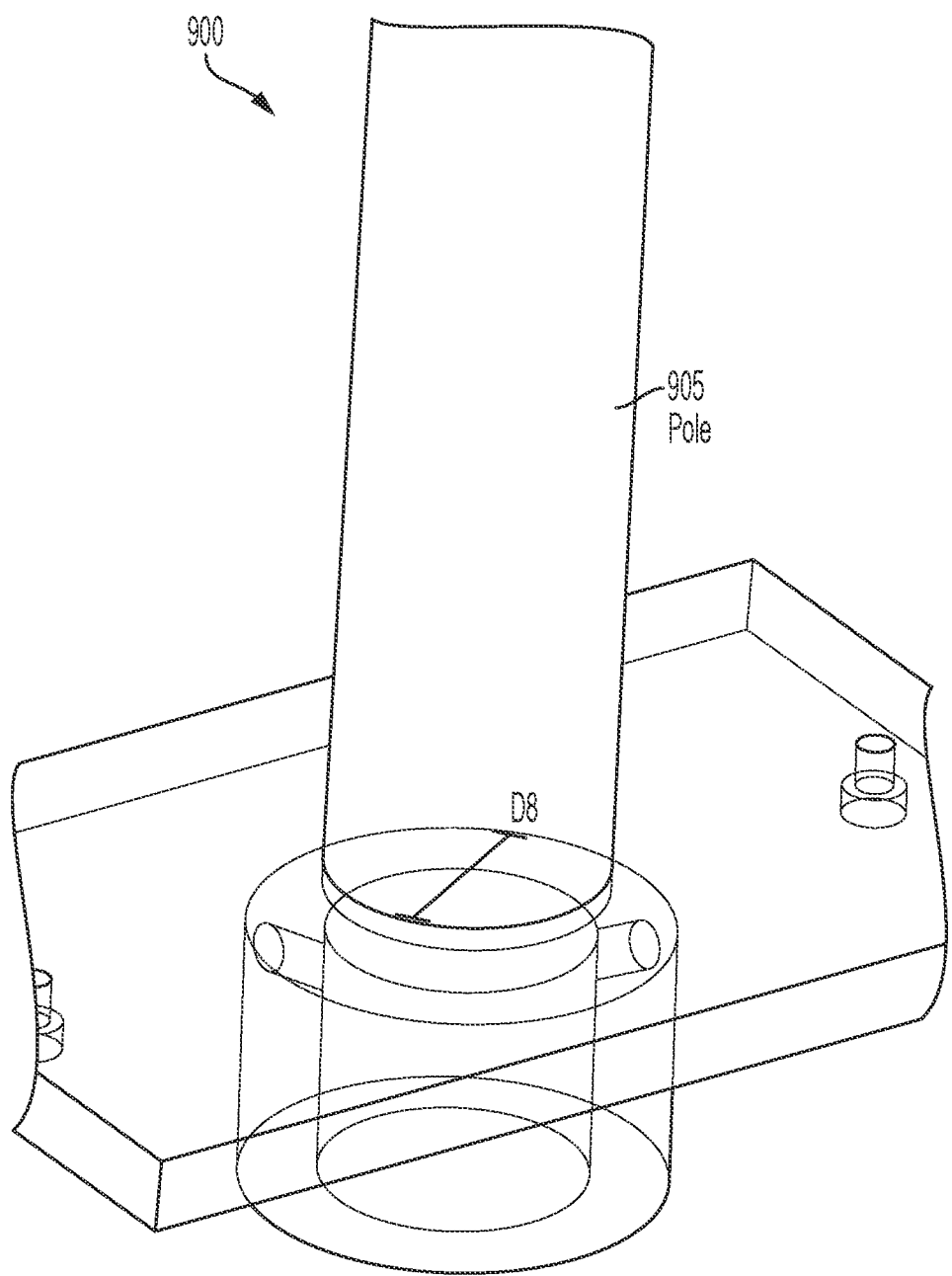
FIG. 9 depicts an example pole assembly.

FIG. 9 depicts an example pole assembly 900. Assembly 900 can include a pole 905. Pole 905 can be described as herein. Pole 905 can be coupled with a pole end 700. Pole 905 can be made of any material, such as plastic (e.g., polycarbonate (PC) or polyvinyl chloride (PVC)), metal (e.g., aluminum, steel, titanium, or an alloy thereof), or wood (e.g., oak or bamboo). Pole 905 can be used to support a string light (e.g., string lights 1780 as described in reference to FIG. 17). Pole 905 can include a diameter D8. D8 can be greater than D2 or D4. D8 can be between 2 cm-4 cm. D8 can be between 3 cm-5 cm. D2 can be greater than 5 cm. D2 can be less than 2 cm. Pole 905 can be fitted or attached onto a pole end 700. In some implementations, pole 905 can be fitted with or coupled to pole end 700 and can subsequently be inserted into an insertion holder, such as holder 100 or 400. In some implementations, pole 905 can be fitted to or coupled with pole end 700 with threads, such as threads 805. In some implementations, pole 905 can be fitted to or coupled with pole end 700 with ball-nose spring plungers which can deploy into the groove 710 of pole end 700 to hold the pole 905 in place with friction.

Figure 10:
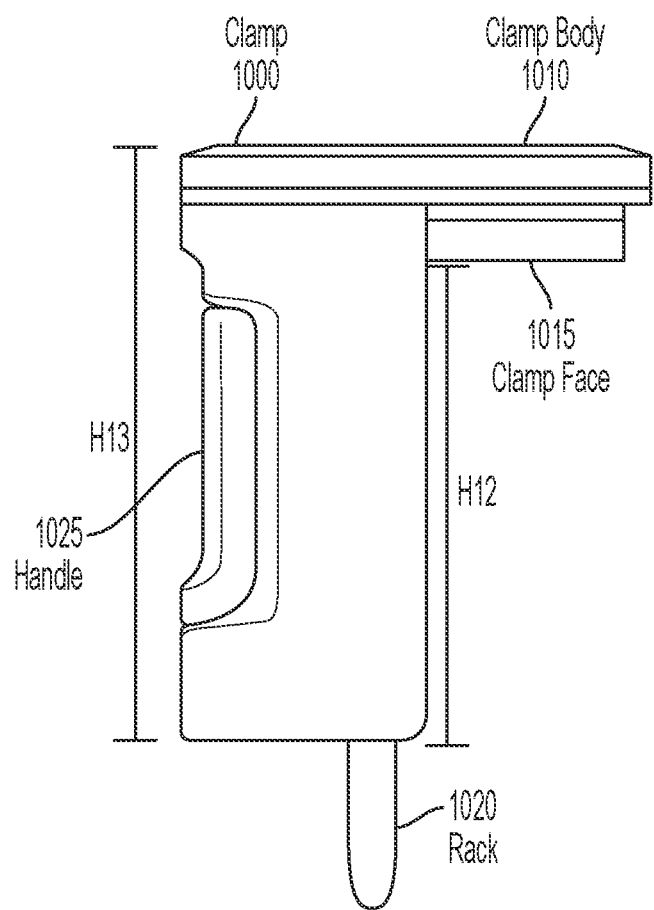
FIG. 10 depicts a side view of an example clamp.
Figure 11:
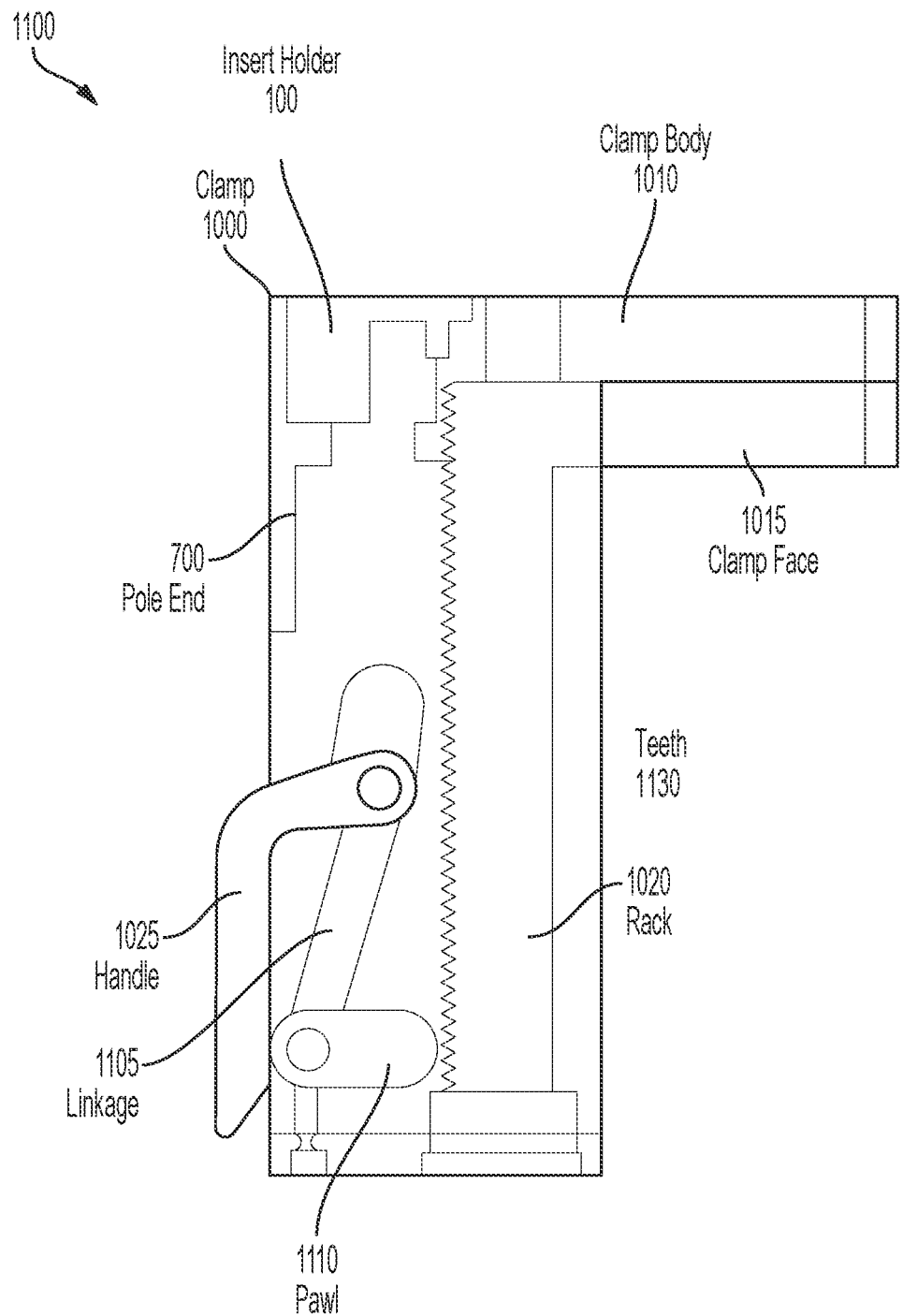
FIG. 11 depicts a cross sectional view of an example clamp.

FIGS. 10 and 11 depict a clamp 1000 for affixing a pole (e.g., pole 905) to a surface (e.g., a shuttle 1795 as described herein). FIG. 10 depicts a side view of the clamp 1000 and FIG. 11 depicts a cross-sectional view of the clamp 1000. Clamp 1000 can include a clamp body 1010, a clamp face 1015, a rack 1020 with teeth 1130, a handle 1025, the holder 100, the pole end 700, a linkage 1105, a pawl 1110, and heights H12 and H13. Clamp 1000 can be made out of plastic (e.g., polycarbonate (PC) or polyvinyl chloride (PVC)), metal (e.g., aluminum, steel, titanium, or an alloy thereof), or wood (e.g., oak or bamboo). Clamp 1000 can be fabricated by any means known to those in the art, such as casting, molding, carving, milling, welding, or machining. For example, lifting the handle 1025 of the clamp 1000 can actuate the linkage 1105 and pawl 1110 to engage with the teeth 1130 of the rack 1020 to raise or lower the rack 1020. In some cases, raising or lowering the rack 1020 can thereby raise or lower the clamp face 1015. In an example, a surface can be clamped between the clamp face 1015 and the clamp body 1010 as to provide a stable support for insertion of the pole 905 into the pole end 700.

The clamp 1000 can include a clamp body 1010, which is above a clamp face 1015 and which can rest on top of a surface (e.g., a table, bench, handrail or shuttle 1795). Upon actuation of the clamp 1000, the clamp body 1010 can exert a downwards pressure onto the surface to affix the clamp 1000 to the surface. The clamp body 1010 can be opposite the clamp face 1015. The clamp face 1015 can be below the clamp body 1010. The clamp face 1015 can attach the clamp 1000 to the surface. The clamp face 1015 can exert an upwards pressure onto the surface. The clamp face can move up and down within the same plane through actuation of the handle 1025. The clamp face 1015 can be attached to the rack 1020. The clamp face 1015 can be moved by an actuation of the handle 1025 to move the rack 1020.

The rack 1020 can be any device of the clamp 1000 for moving the clamp face 1015 up and down. The rack can be actuated by the handle 1025, the linkage 1105, and the pawl 1110. The rack 1020 can have teeth 1130. Teeth 1130 can engage with pawl 1110. Rack 1020 can move within the clamp 1000 by an engagement of the teeth 1130 with the pawl 1110.

The pawl 1110 can be a lever to engage with the teeth 1130 of the rack 1020. The pawl can be or include a curved bar or latch. The pawl can restrain movement, such as of the rack 1020. The fulcrum or pivot point of the pawl can attach to the linkage 1105. Linkage 1105 can be any handle, bar, or link for connecting the fulcrum of the pawl 1110 to the handle 1025 of the clamp 1000. The linkage can include two or more pivoting ends. The linkage can translate movement from the handle 1025 to the pawl 1110 to enable actuation of the clamp 1000.

In some cases, the pawl 1110 can hold fast the rack 1020 (and by attachment, the clamp face 1015) in place through a contact with the teeth 1130 of the rack 1020. Similarly, In some implementations, the pawl 1110 can be released (e.g., unengaged) to allow the rack 1020 to move. The pawl 1110 can be actuated through a movement of the handle 1025. The handle can be any pull, bar, button, or lever for actuating the clamp 1000. In some implementations, the handle 1025 can attach to the linkage 1105. In some implementations, lifting the handle 1025 can enable the linkage 1105 to turn, thereby moving the pawl 1110. In some implementations, lowering the handle 1025 can enable the linkage 1105 to turn, thereby moving the pawl 1110. Movement of the pawl 1110, as described herein, can engage the teeth 1130 of the rack 1020 to hold the clamp face 1015 in place.

Figure 12:
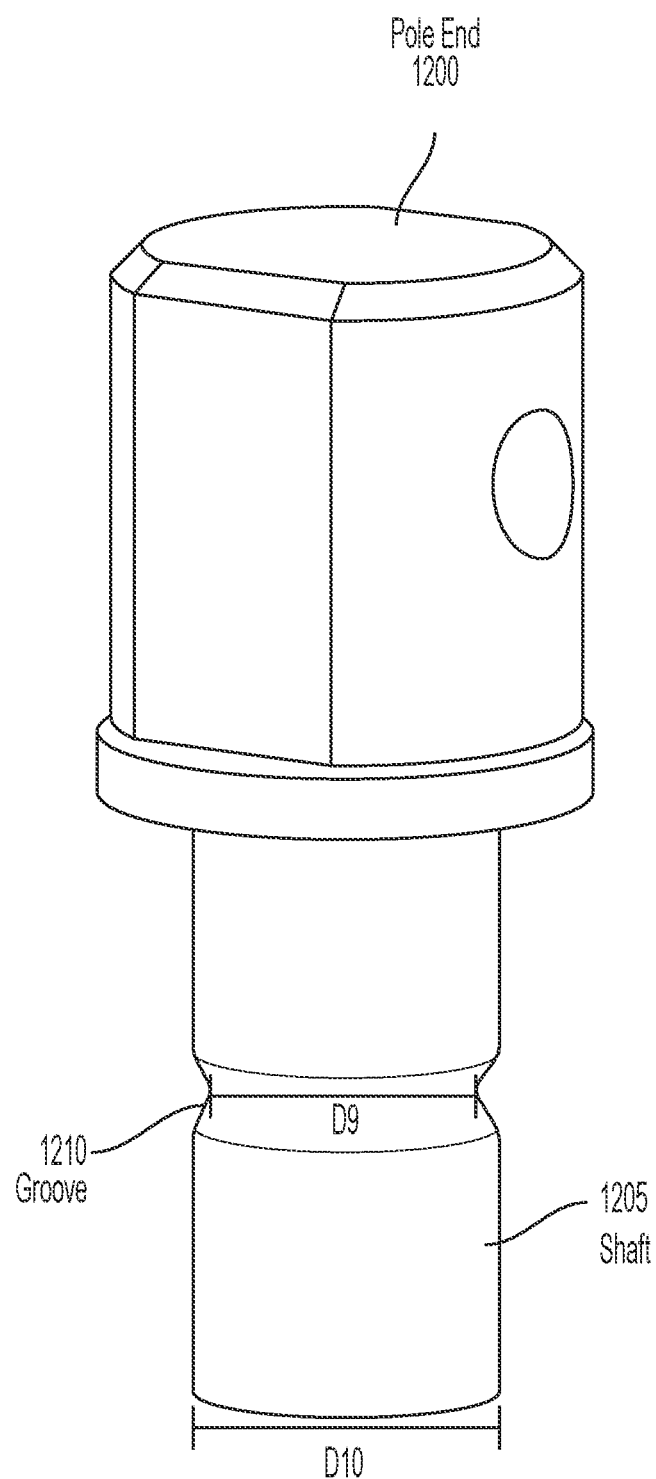
FIG. 12 depicts a view of a pole end with a groove.

FIG. 12 depicts a view of an example pole end 1200 for fitting with a ball-nose plunger. Pole end 1200 can include one or more structure, material, component or functionality of pole end 700. Pole end 1200 can further comprise a groove 1210 and a shaft 1205. Groove 1210 can be an indentation within shaft 1205. Groove 1210 can be used to stabilize the pole end 1200 when inserted into a holder, such as holder 100 or 400. Groove 1210 can have a diameter D9. Shaft 1205 can be a portion of pole end 1200 which inserts into a holder (e.g., holder 100 or 400). Shaft 1205 can have a diameter of D10. D10 can be greater than D9. D10 can be between 0.2 mm-1.5 mm. In some implementations, D10 can be between 1 mm-5 mm. D10 can be less than 0.2 mm. D10 can be greater than 5 mm. D9 can be between 0.1 mm-1.5 mm. D9 can be between 0.5 mm-3 mm. D9 can be less than 0.1 mm. D9 can be greater than 3 mm. For example, insertion of the shaft 1205 into a holder 100 or 400 can act as described in reference to pole end 700 and holders 100 and 400.

Figure 13:
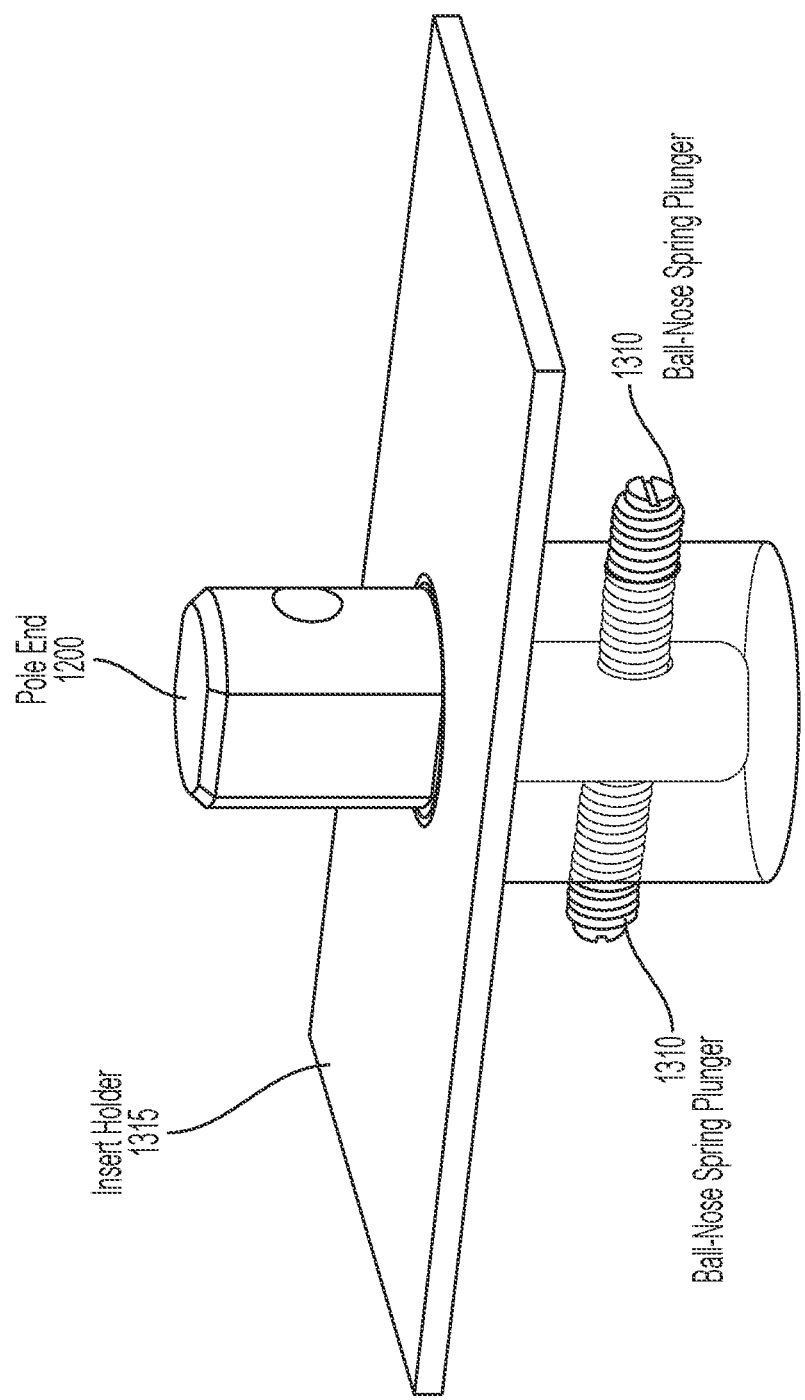
FIG. 13 depicts an example assembly of a pole end and holder with ball-nose spring plungers.

FIG. 13 depicts an example assembly 1300 of pole end 1200 and an insertion holder with ball-nose spring plungers. Assembly 1300 can include pole end 1200, insertion holder 1315, and ball-nose spring plungers 1310. Insertion holder 1315 can include all of the functionalities of holders 100 or 400. Insertion holder 1315 (or "holder 1315") can include one or more ball-nose spring plungers 1310. A ball-nose spring plunger 1310 can be a spring-loaded device which, once actuated, can apply pressure adequate as hold the pole end 1200 in place with friction against the holder 1315.

The pole end 1200 can be inserted into the holder 1315. In some implementations, subsequent to the insertion, the ball-nose spring plunger(s) 1310 can engage to couple to the groove 1210 (as described with reference to FIG. 12) of the pole end 1200. In some implementations, the engagement of the ball-nose spring plunger 1310 can couple to the groove 1210 with enough spring force as to holder the pole end 1200 in place laterally with friction. In some implementations, the pressure exerted by the ball-nose spring plungers 1310 can be less than a force that removes the pole end 1200 vertically by hand.

Figure 14:
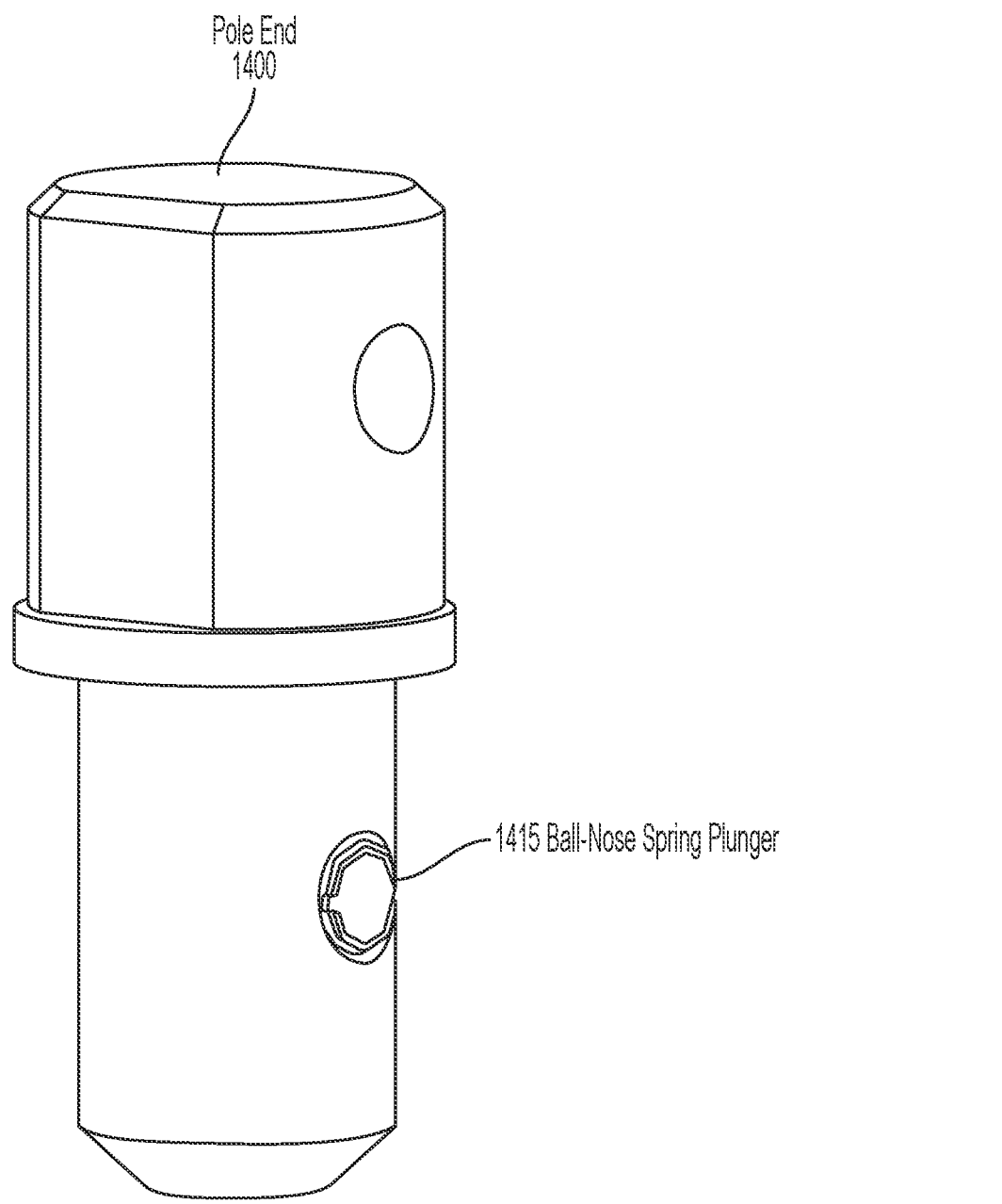
FIG. 14 depicts a view of an example pole end.

FIG. 14 depicts an example pole end 1400. Pole end 1400 can be described as or have the functionality as pole end 700. Pole end 1400 can further include one or more ball-nose spring plungers 1415. Pole end 1400 can be inserted into a holder (e.g., holder 100 or 400) in the manner described herein. In some implementations, insertion of the pole end 1400 into a holder (e.g., holder 100 or 400) can enable the ball-nose spring plunger(s) 1415 to exude a spring force against the holder 100 or 400 to hold the pole end 1400 in place within the holder 100 or 400 by friction.

Figure 15:
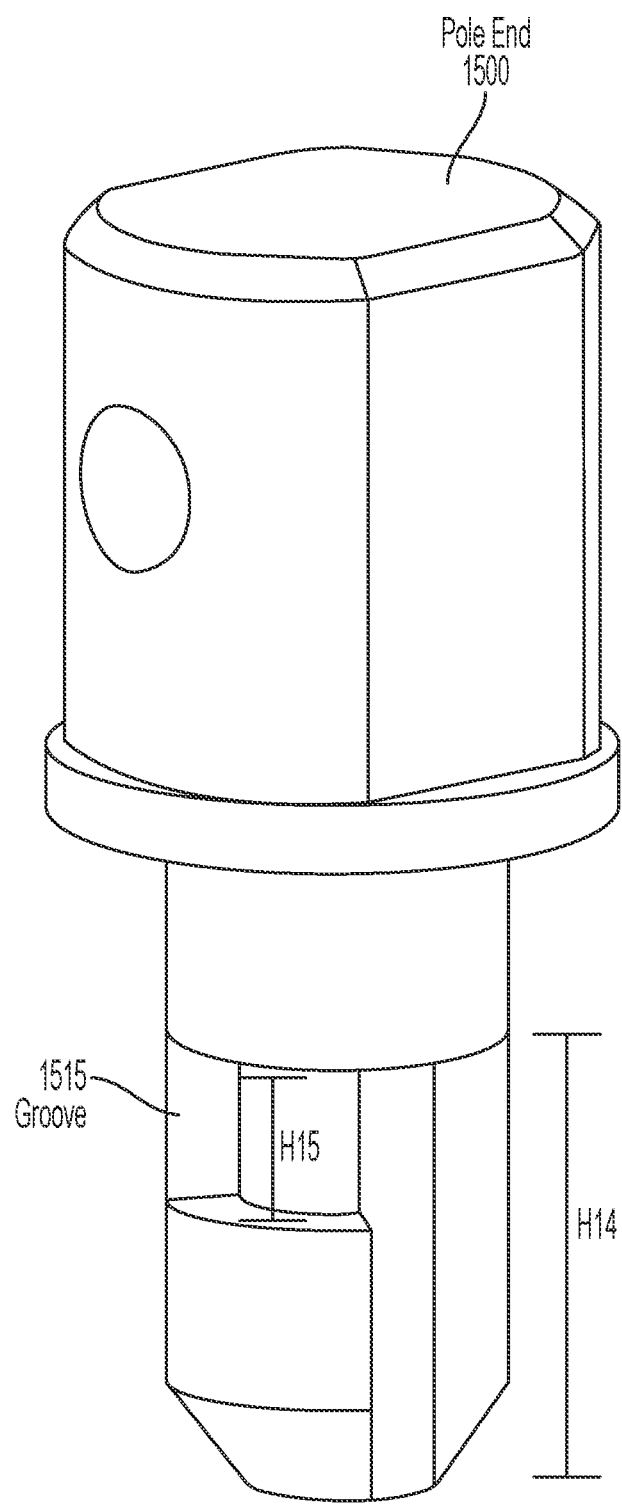
FIG. 15 depicts a view of an example pole end with a groove.

FIG. 15 depicts a view of an example pole end 1500 with a groove to align with a holder. Pole end 1500 can be or have any of the functionality of the pole end 700, described herein. Pole end 1500 can include a groove 1515. Groove 1515 can include heights H14 and H15. H15 can be less than H14. H15 can be between 1 mm-5 mm. H15 can be between 2 mm-10 mm. H15 can be greater than 10 mm. H15 can be less than 1 mm. H14 can be between 2 mm-8 mm. H14 can be between 6 mm-15 mm. H15 can be less than 2 mm. H14 can be greater than 15 mm.

In some implementations, the pole end 1500 can be inserted into a holder (e.g., holder 100 or 400) as described herein in reference to at least pole 700 in FIG. 7. Pole end 1500 can engage with a holder as described to holder the pole end 1500 in place with friction. In some implementations, subsequent to the insertion of pole end 1500 into a holder (e.g., holder 100 or 400), the pole end 1500 can be rotated to maintain the pole end 1500 in a stable position.

Figure 16:
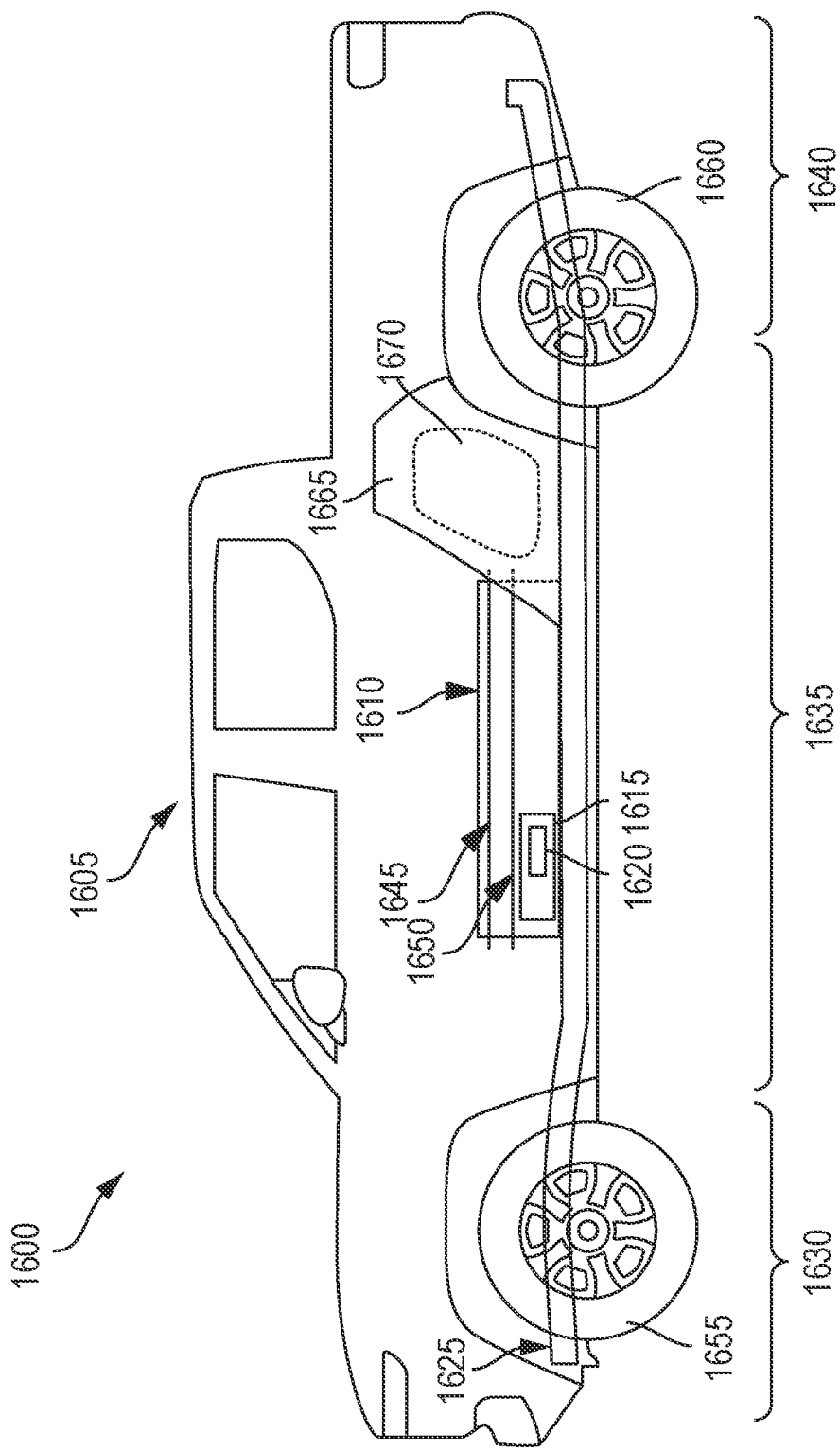
FIG. 16 depicts a vehicle.

FIG. 16 depicts an example cross-sectional view 1600 of a vehicle 1605 such as an electric vehicle installed with at least one battery pack 1610. Electric vehicles 1605 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 1610 can also be used as an energy storage system to power a building, such as a residential home or commercial building. Electric vehicles 1605 can be fully electric or partially electric (e.g., plug-in hybrid) and further, electric vehicles 1605 can be fully autonomous, partially autonomous, or unmanned. Electric vehicles 1605 can also be human operated or non-autonomous. Electric vehicles 1605 such as electric trucks or automobiles can include on-board battery packs 1610, batteries 1615 or battery modules 1615, or battery cells 1620 to power the electric vehicles. The electric vehicle 1605 can include a chassis 1625 (e.g., a frame, internal frame, or support structure). The chassis 1625 can support various components of the electric vehicle 1605. The chassis 1625 can span a front portion 1630 (e.g., a hood or bonnet portion), a body portion 1635, and a rear portion 1640 (e.g., a trunk, payload, or boot portion) of the electric vehicle 1605. The battery pack 1610 can be installed or placed within the electric vehicle 1605. For example, the battery pack 1610 can be installed on the chassis 1625 of the electric vehicle 1605 within one or more of the front portion 1630, the body portion 1635, or the rear portion 1640. The battery pack 1610 can include or connect with at least one busbar, e.g., a current collector element. For example, the first busbar 1645 and the second busbar 1650 can include electrically conductive material to connect or otherwise electrically couple the battery 1615, the battery modules 1615, or the battery cells 1620 with other electrical components of the electric vehicle 1605 to provide electrical power to various systems or components of the electric vehicle 1605.

The vehicle 1605 can include a compartment or tunnel 1670 that extends into the vehicle 1605 on at least one side of the vehicle. The tunnel 1670 can be located between a cab of the vehicle 1605 and the rear portion 1640, e.g., a truck bed. The tunnel 1670 can include an opening on at least one side of the vehicle 1605. The tunnel 1670 can include an opening on a driver side of the vehicle 1605 and another opening on a passenger side of the vehicle 1605. The vehicle 1605 can include at least one door 165.

The door 1665 can rotate on an apparatus, e.g., a hinge between an open position exposing the opening of the tunnel 1670 to a closed position covering the opening of the tunnel 1670. The hinge can be fastened to a bottom side of the door 1665 and to the vehicle 1600. The hinge can rotate a top side of the door 1665 downwards towards a surface under the vehicle 1600. When in the open position, the door 1665 may be parallel to a floor of the vehicle 1600 or perpendicular to a side of the vehicle 1600. Components, such as an apparatus 1775, can extend out of the tunnel 1670 over the door 1665 when the door 1665 is opened. The components, such as the apparatus 1775 can extend over the shuttle 1795. The shuttle 1795 or the door 1665 in the open position can support the weight of the apparatus 1775. The door 1665 can support a maximum of 280-320 pounds of weight. The door can support a maximum weight less than 280 pounds. The door can support a maximum weight more than 320 pounds.

The compartment 1670 can be accessible to a user from an exterior of the vehicle 1605. The compartment 1670 can be accessible to a user in an interior of the vehicle 1605. The compartment 1670 can be located between an occupant seating area (e.g., a front seating area, a rear seating area, a passenger side seating area, a driver side seating area) and the rear portion 1640 of the vehicle. The compartment 1670 can be included under a front hood of the vehicle 1605. The compartment 1670 can be included within a rear trunk of the vehicle 1605. The compartment 1670 can be included within a truck bed of the vehicle 1605.

FIG. 17 depicts an example vehicle 1605 including at least one apparatus 1775, such as an apparatus to hold lights. The apparatus 1775 can be or include a table, surface, mounts, clamps, poles, string lights, fastening system, stabilizing system, camp kitchen, or support system. The apparatus 1775 can be configured to extend from the compartment 1670. The apparatus 1775 can be configured to stow or store within the compartment 1670. For example, the apparatus 1775 can retract from an extended position into a stowed or stored position within the compartment 1670. The vehicle 1605 can include at least one shuttle 1795. The apparatus 1775 can be directly or indirectly fixed to the shuttle 1795. The shuttle 1795 can be or include a table, a sled or flat portion. The shuttle 1795 can be stored within a tunnel, such as a gear tunnel for storing gear, of the vehicle 1605. In some embodiments, a table can extend from the gear tunnel, such as the shuttle 1795. The shuttle 1795 can extend from the gear tunnel and be supported by at least one support 1790. The support 1790 can include a leg, multiple legs, at least one pipe, wheel, or box.

The apparatus 1775 can be fixed to a top surface of the shuttle 1795 and supported by the shuttle 1795. The shuttle 1795 can be configured to transport, extend, or move the entertainment apparatus out of the tunnel 1670. The shuttle 1795 can be 60-70 inches long. The shuttle 1795 can be 55-75 inches long. The shuttle 1795 can be less than 55 inches long. The shuttle 1795 can be more than 75 inches long. The shuttle 1795 can be 18-19 inches wide. The shuttle 1795 can be 17-20 inches wide. The shuttle 1795 can be less than 18 inches wide. The shuttle 1795 can be more than 20 inches wide. The shuttle 1795 can be 0.5-1.5 inches thick. The shuttle 1795 can be 0.2-2 inches thick. The shuttle 1795 can be more than 2 inches thick. The shuttle 1795 can be less than 0.2 inches thick. The shuttle 1795 can include a top portion, a bottom portion, at least one lateral wall, and at least one end. The shuttle 1795 can be a rectangular solid or a prismatic shape.

The apparatus 1775 can include string lights 1780. String lights 1780 can be any type of lights which can be hung, folded, rolled, or otherwise maneuvered. String lights 1780 can be attached to one or more poles 905. String lights 1780 can attach to poles 905 magnetically, by a hinge or clasp, by tying, with a pin (e.g., a cotter pin), with adhesive, Velcro, or with a hook and eyelet. String lights 1780 can be solar-powered, plug-in rechargeable, powered through a cord, powered by the batteries 1615 of the vehicle, powered by external batteries, or chemically lit (e.g., such as by a reaction of diphenyl oxalate and hydrogen peroxide). In some implementations, the string lights 1780 can illuminate the area immediately around the shuttle 1795, such as fir illuminating a camp kitchen. String lights 1780 can be any length. String lights 1780 can be 80-90 inches long. String lights 1780 can be 65-95 inches long. String lights 1780 can be less than 65 inches long. String lights 1780 can be greater than 95 inches long. String lights 1780 can be a weight which can be supported by one or more poles 905. String lights 1780 can weigh between 18-34 ounces. String lights 1780 can weigh between 16-32 ounces. String lights 1780 can weigh less than 16 ounces. String lights 1780 can weigh more than 32 ounces.

String lights 1780 can be supported by one or more poles 905. In some implementations, one or more poles 905 can support hanging string lights 1780. Poles 905 can be as described herein. Poles 905 can insert into or be supported by a holder, such as holder 100 or 400. Holder 100 or 400, as described herein, can be disposed within the shuttle 1795. In some implementations, holder 100 or 400 can be located in a camp kitchen. In some implementations, the poles 905 can be supported by the holder 100 or 400 in conjunction with the pole end 700 (not pictured but described herein).

Figure 18:
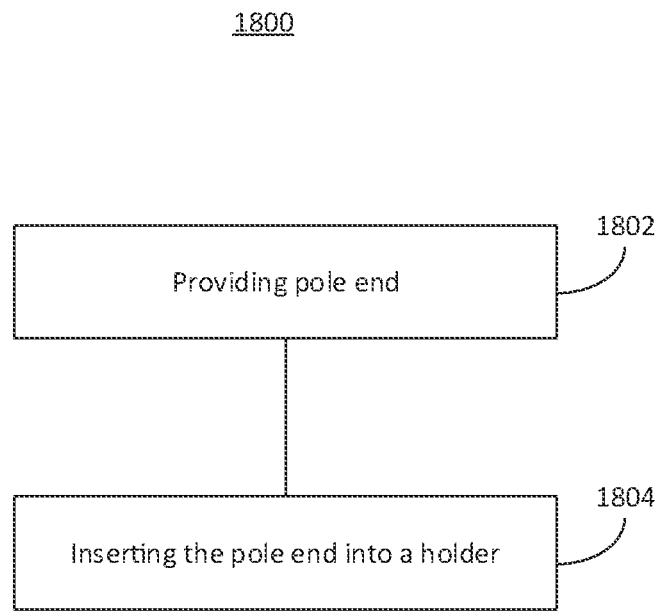
FIG. 18 depicts an example method of inserting a pole end into an insert holder.

FIG. 18 depicts an example method 1800 of inserting a pole end into an insert holder. The method 1800 can be performed by one or more system or component depicted in FIGS. 1-17, including, for example, a pole end and an insert holder. At ACT 1802, the method 1800 can include providing a pole end. The pole end can be stowed in a vehicle, container, compartment, or other location. A user can provide the pole end. The pole end can include a protrusion. The pole end can include a bottom portion opposite a top portion of the pole end that couples with the pole.

At ACT 1804, the method 1800 can include inserting the pole end into a holder. A user or manufacturer can inset the pole end into the holder. The holder can include a first opening located on a top portion of the holder. The holder can include a groove located on the top portion of the holder. The groove can be configured to receive the protrusion of the pole end to align the pole end with the holder. The holder can include a second opening located on a side portion of the holder, the second opening located below the first opening. The holder can include a third opening. The third opening can be located on a bottom portion of the holder. The third opening can be located below the first opening and the second opening. The third opening can be configured to receive the bottom portion of the pole end.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

The processes and logic flows described in this specification can be performed in any order. While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation.

Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
    a holder to receive a pole, the holder comprising:
        a first opening located on a first portion of the holder; and
        a second opening located on a second portion of the holder, the second opening configured to engage the pole in the holder, wherein the second opening is offset from a groove, and the groove configured to receive a protrusion of the pole to align the pole with the holder.

2. The system of claim 1, wherein the first portion of the holder comprises a top portion of the holder and the second portion of the holder comprises a side portion of the holder, and the holder comprises:
    the groove located on the top portion of the holder; and
    a third opening located on a bottom portion of the holder, the third opening located below the first opening and the second opening, and the third opening configured to receive a bottom portion of the pole.

3. The system of claim 1, comprising:
    a clamp to couple with the holder, the clamp comprising:
        a rack with teeth configured to engage a pawl; and
        a handle coupled to the pawl via a linkage, the handle configured to actuate the pawl to engage with the rack.

4. The system of claim 1, wherein a diameter of the pole is less than a diameter of the first opening and greater than a diameter of a third opening, the third opening located on a bottom portion of the holder, the third opening located below the first opening and the second opening, and the third opening configured to receive a bottom portion of the pole.

5. The system of claim 1, wherein a diameter of a third opening is less than a diameter of the first opening, wherein the third opening is located on a bottom portion of the holder, wherein the third opening is located below the first opening and the second opening, and wherein the third opening is configured to receive a bottom portion of the pole.

6. The system of claim 1, wherein a first diameter of the protrusion is less than a second diameter of the second opening.

7. The system of claim 1, wherein the pole comprises a ball-nose spring plunger to engage the holder with friction.

8. The system of claim 1, wherein the holder is located in a camp kitchen positioned at a gear tunnel of a vehicle.

9. A vehicle, comprising:
    a holder to receive a pole, the holder comprising:
        a first opening located on a first portion of the holder; and
        a second opening located on a second portion of the holder, the second opening configured to engage the pole in the holder, wherein the second opening is offset from a groove, the groove located on the first portion of the holder, and the groove configured to receive a protrusion of the pole to align the pole with the holder.

10. The vehicle of claim 9, wherein the first portion of the holder comprises a top portion of the holder and the second portion of the holder comprises a side portion of the holder, and the holder comprises:
    the groove located on the top portion of the holder; and
    a third opening located on a bottom portion of the holder, the third opening located below the first opening and the second opening, and the third opening configured to receive a bottom portion of the pole.

11. The vehicle of claim 9, further comprising the holder disposed within a retractable table of the vehicle.

12. The vehicle of claim 9, wherein a diameter of the pole is less than a diameter of the first opening and greater than a diameter of a third opening, the third opening located on a bottom portion of the holder, the third opening located below the first opening and the second opening, and the third opening configured to receive a bottom portion of the pole.

13. The vehicle of claim 9, wherein a diameter of a third opening is less than a diameter of the first opening, wherein the third opening is located on a bottom portion of the holder, wherein the third opening is located below the first opening and the second opening, and wherein the third opening is configured to receive a bottom portion of the pole.

14. A method, comprising:
    receiving, by a holder, a pole, the holder comprising:
        a first opening located on a top portion of the holder;

a groove located on the top portion of the holder, the groove configured to receive a protrusion of the pole to align the pole with the holder;

a second opening located on a side portion of the holder, the second opening located below the first opening; and a third opening, located on a bottom portion of the holder, the third opening located below the first opening and the second opening and configured to receive a bottom portion of the pole.

15. The method of claim 14, wherein the pole comprises a ball-nose spring plunger to engage the holder with friction.

16. The method of claim 14, comprising:

retracting, from a gear tunnel, a table comprising the holder; and receiving, by the holder, the pole subsequent to retracting the table from the gear tunnel.

17. The method of claim 14, comprising:

providing the holder at a camp kitchen positioned at a gear tunnel of a vehicle.

18. The method of claim 14, comprising:

providing a clamp to couple with the holder, the clamp comprising:

a rack with teeth configured to engage a pawl; and a handle coupled to the pawl via a linkage, the handle configured to actuate the pawl to engage with the rack.

* * * * *